United States Patent
Goyal et al.

(10) Patent No.: US 11,902,929 B2
(45) Date of Patent: Feb. 13, 2024

(54) METHODS, APPARATUSES AND SYSTEMS DIRECTED TO IDLE/INACTIVE MODE POSITIONING IN NR

(71) Applicant: InterDigital Patent Holdings, Inc., Wilmington, DE (US)

(72) Inventors: Sanjay Goyal, Deer Park, NY (US); Kevin T. Wanuga, Souderton, PA (US); Arnab Roy, Phoenixville, PA (US); Alpaslan Demir, East Meadow, NY (US); Janet Stern-Berkowitz, Little Neck, NY (US); Muhammad Fazili, Audubon, PA (US); Mihaela Beluri, Jericho, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 292 days.

(21) Appl. No.: 17/441,008

(22) PCT Filed: Mar. 16, 2020

(86) PCT No.: PCT/US2020/022965
§ 371 (c)(1),
(2) Date: Sep. 20, 2021

(87) PCT Pub. No.: WO2020/197829
PCT Pub. Date: Oct. 1, 2020

(65) Prior Publication Data
US 2022/0167301 A1    May 26, 2022

Related U.S. Application Data

(60) Provisional application No. 62/824,695, filed on Mar. 27, 2019.

(51) Int. Cl.
*H04W 64/00* (2009.01)
*G01S 5/12* (2006.01)
(Continued)

(52) U.S. Cl.
CPC ............... *H04W 64/00* (2013.01); *G01S 5/12* (2013.01); *G01S 19/01* (2013.01); *H04L 5/0048* (2013.01); *H04W 74/0833* (2013.01)

(58) Field of Classification Search
CPC . H04W 64/00; H04W 74/0833; H04W 76/27; G01S 5/12; G01S 19/01;
(Continued)

(56) References Cited

U.S. PATENT DOCUMENTS

| 2017/0079006 A1 | 3/2017 | Li et al. |
| 2017/0280483 A1 | 9/2017 | Liu et al. |

(Continued)

FOREIGN PATENT DOCUMENTS

| BR | 112017028337 A2 | 9/2018 |
| WO | 2017007386 A1 | 1/2017 |

(Continued)

OTHER PUBLICATIONS

Anonymous, "Views on NR DL&UL positioning techniques", 3rd Generation Partnership Project (3GPP), 3GPP TSG RAN WG1, Document: R1-1902836, Meeting #96, Athens, Greece, Feb. 25, 2019, 3 pages.

(Continued)

*Primary Examiner* — Don N Vo
(74) *Attorney, Agent, or Firm* — Volpe Koenig

(57) ABSTRACT

Methods, apparatuses, systems, etc., directed to performing positioning of a wireless transmit/receive unit (WTRU) while it is in idle mode and/or inactive mode (collectively "idle/inactive mode") in NR are disclosed herein. Performing positioning, including positioning measurement and/or (Continued)

reporting, in idle/inactive mode may allow for increased positioning accuracy and/or decreased latency of location determination. In various embodiments, a WTRU in idle/inactive mode may transmit a positioning measurement report in various ways, including (i) in a Random-Access Channel (RACH) preamble; (ii) appended to a RACH preamble; and/or (iii) in a Physical Uplink Shared Channel. In various embodiments, a WTRU in idle/inactive mode may transmit uplink-based positioning related reference signals. In various embodiments, a WTRU in an idle/inactive mode may transmit, over a dedicated physical channel, (e.g., downlink) positioning measurement reports and/or reference signals (RSs) for uplink positioning measurements.

20 Claims, 22 Drawing Sheets

(51) Int. Cl.
*G01S 19/01* (2010.01)
*H04L 5/00* (2006.01)
*H04W 74/08* (2009.01)

(58) Field of Classification Search
CPC .......... G01S 19/48; G01S 5/0205; G01S 5/10; G01S 5/0236; H04L 5/0048
USPC ........................................ 375/267
See application file for complete search history.

(56) References Cited

U.S. PATENT DOCUMENTS

| | | | |
|---|---|---|---|
| 2017/0339658 A1 | 11/2017 | Wang et al. | |
| 2018/0220392 A1 | 8/2018 | Ly | |
| 2019/0281587 A1* | 9/2019 | Zhang | H04W 72/23 |
| 2020/0028648 A1 | 1/2020 | Akkarakaran et al. | |
| 2020/0029358 A1 | 1/2020 | Akkarakaran et al. | |
| 2022/0124622 A1* | 4/2022 | Islam | H04W 72/542 |
| 2022/0256436 A1* | 8/2022 | Guo | H04W 40/36 |
| 2022/0312481 A1* | 9/2022 | Talarico | H04W 72/0446 |

FOREIGN PATENT DOCUMENTS

| | | |
|---|---|---|
| WO | WO 2018019365 A1 | 2/2018 |
| WO | 2020018903 A1 | 1/2020 |
| WO | 2020146739 A1 | 7/2020 |

OTHER PUBLICATIONS

Anonymous, "Stage 2 functional specification of User Equipment (UE) positioning in E-UTRAN", 3rd Generation Partnership Project (3GPP), Technical Specification Group Radio Access Network; Evolve Universal Terrestrial Radio Access Network (E-UTRAN), Document: 3GPP TS 36.305 V15.2.0, Dec. 2018, 88 pages.

Anonymous, "Views on DL and UL positioning techniques", 3rd Generation Partnership Project (3GPP), 3GPP TSG RAN WG1, Document: R1-1901716, Meeting #96, Athens, Greece, Feb. 25, 2019, 5 pages.

Federal Communications Commission, "Fourth Report and Order: Wireless E911 Location Accuracy Requirements", Release Date: Feb. 3, 2015, 116 pages.

Anonymous, "Service requirements for the 5G system; Stage 1", 3rd Generation Partnership Project (3GPP), Technical Specification Group Services and System Aspects; Document: 3GPP TS 22.261 V16.6.0. Dec. 2018, 73 pages.

Anonymous, "Study on NR positioning support (Release 16)", 3rd Generation Partnership Project (3GPP); Technical Specification Group Radio Access Network; Document: 3GPP TR 38.855 V1.0.0, Dec. 2018, 15 pages.

* cited by examiner

METHODS, APPARATUSES AND SYSTEMS DIRECTED TO IDLE/INACTIVE MODE POSITIONING IN NR

This application claims the benefit, under 35 U.S.C. § 371 of International Application PCT/US2020/022965, filed Mar. 16, 2020, which was published in accordance with PCT Article 21(2) on Oct. 1, 2020, in English, and which claims the benefit of U.S. Patent Application No. 62/824,695, filed Mar. 27, 2019.

BACKGROUND

The present disclosure relates to network communications, including, but not exclusively, to methods, apparatuses, systems, etc. directed to performing positioning in idle mode and/or inactive mode in NR.

Positioning may allow for a geographical location (position) of a mobile terminal to be determined. The position may be used to support Evolved Universal Mobile Telecommunications System Terrestrial Radio Access Network (E-UTRAN) functions, such as radio resource management. The position may also be used to support location-based services and/or applications, e.g., for operators, subscribers, and third-party service providers. Examples of these services and applications include emergency call support, such as to support Internet protocol Multimedia Subsystem (IMS) emergency call over an Evolved Packet System (EPS) or a compliancy to the E-911 regulatory requirement of the Federal Communications Commission (FCC), entitled "FCC Fourth Report and Order: Wireless E911 Location Accuracy Requirements". Other examples of services and applications using a positioning include Google Maps, targeted advertising, etc.

SUMMARY

Methods, apparatuses, systems, etc., directed to performing positioning in idle mode and/or inactive mode (collectively "idle/inactive mode") in NR are disclosed herein. In an embodiment, a wireless transmit receive unit (WTRU) may perform positioning measurement in idle/inactive mode. In an embodiment, a WTRU may perform positioning measurement (e.g., downlink) and reporting in idle/inactive mode. Performing positioning measurement and reporting in idle/inactive mode may allow for increased positioning accuracy and/or decreased latency of location determination. In an embodiment, a WTRU may transmit a positioning measurement report in a random-access channel (RACH) preamble in idle/inactive mode. In an embodiment, a WTRU may transmit a positioning measurement report appended to a RACH preamble in idle/inactive mode. In an embodiment, a WTRU may transmit a positioning measurement report in a physical uplink shared channel (PUSCH) in idle/inactive mode. In an embodiment, a WTRU may be configured to transmit uplink-based positioning related reference signals in an idle/inactive mode. In an embodiment, a WTRU may be configured to transmit (e.g., downlink) positioning measurement reports and/or a reference signal (RS) for uplink positioning measurements over a dedicated (e.g., new) physical channel while running in idle/inactive mode.

Although various embodiments are described and/or claimed herein in which an apparatus, system, device, etc. and/or any element thereof is configured to carry out an operation, process, algorithm, function, etc. and/or any portion thereof, it is be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
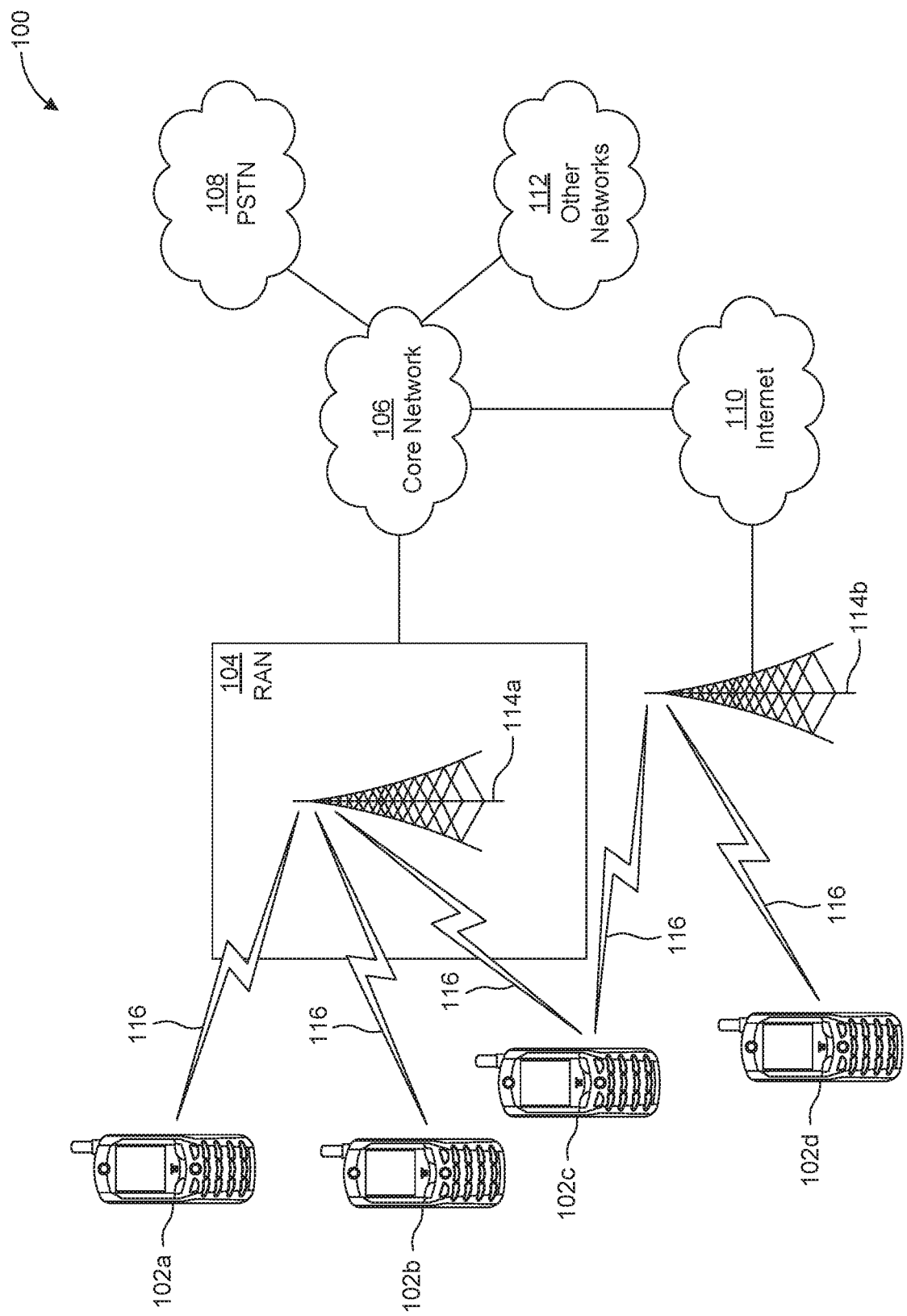
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
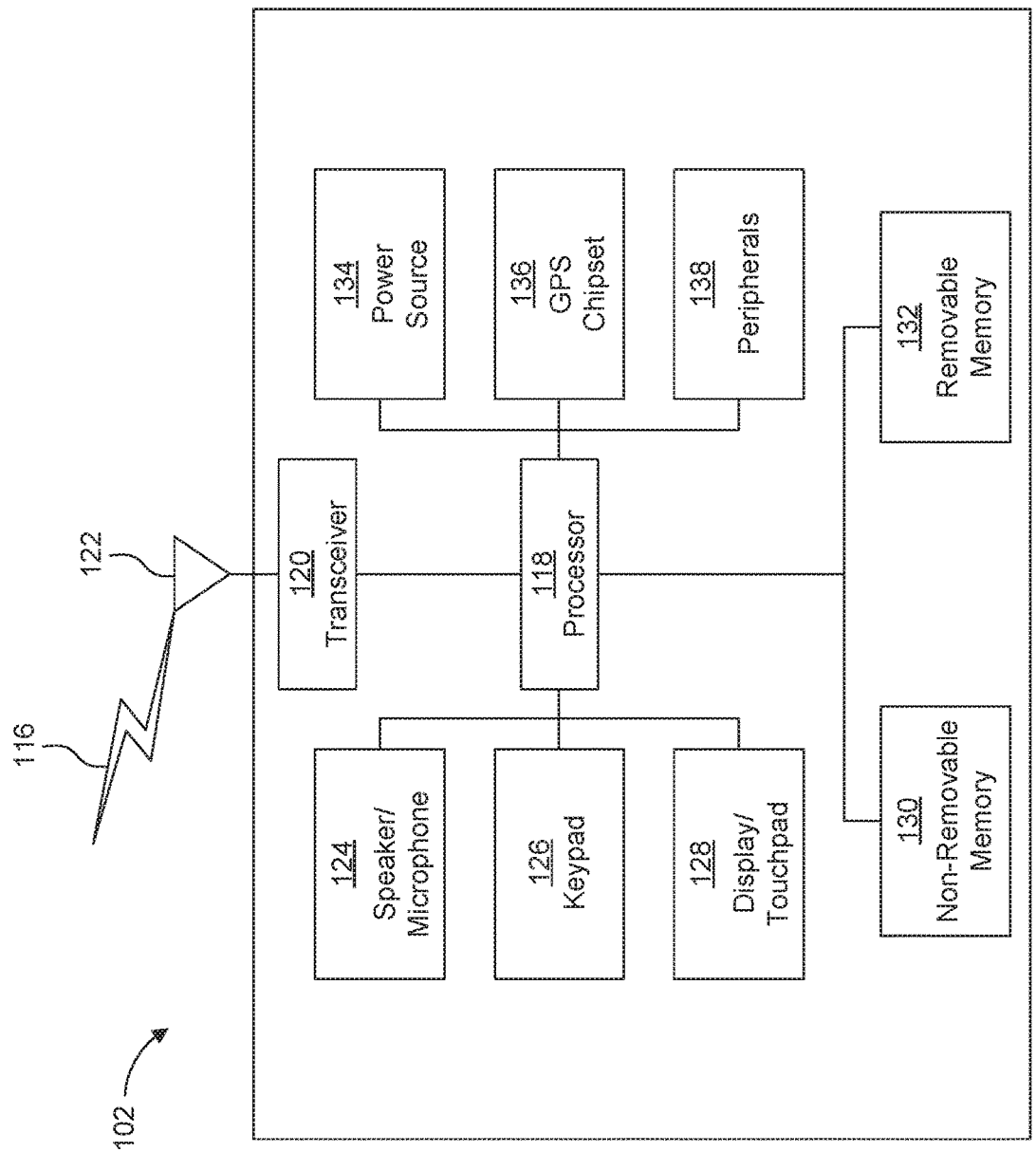
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
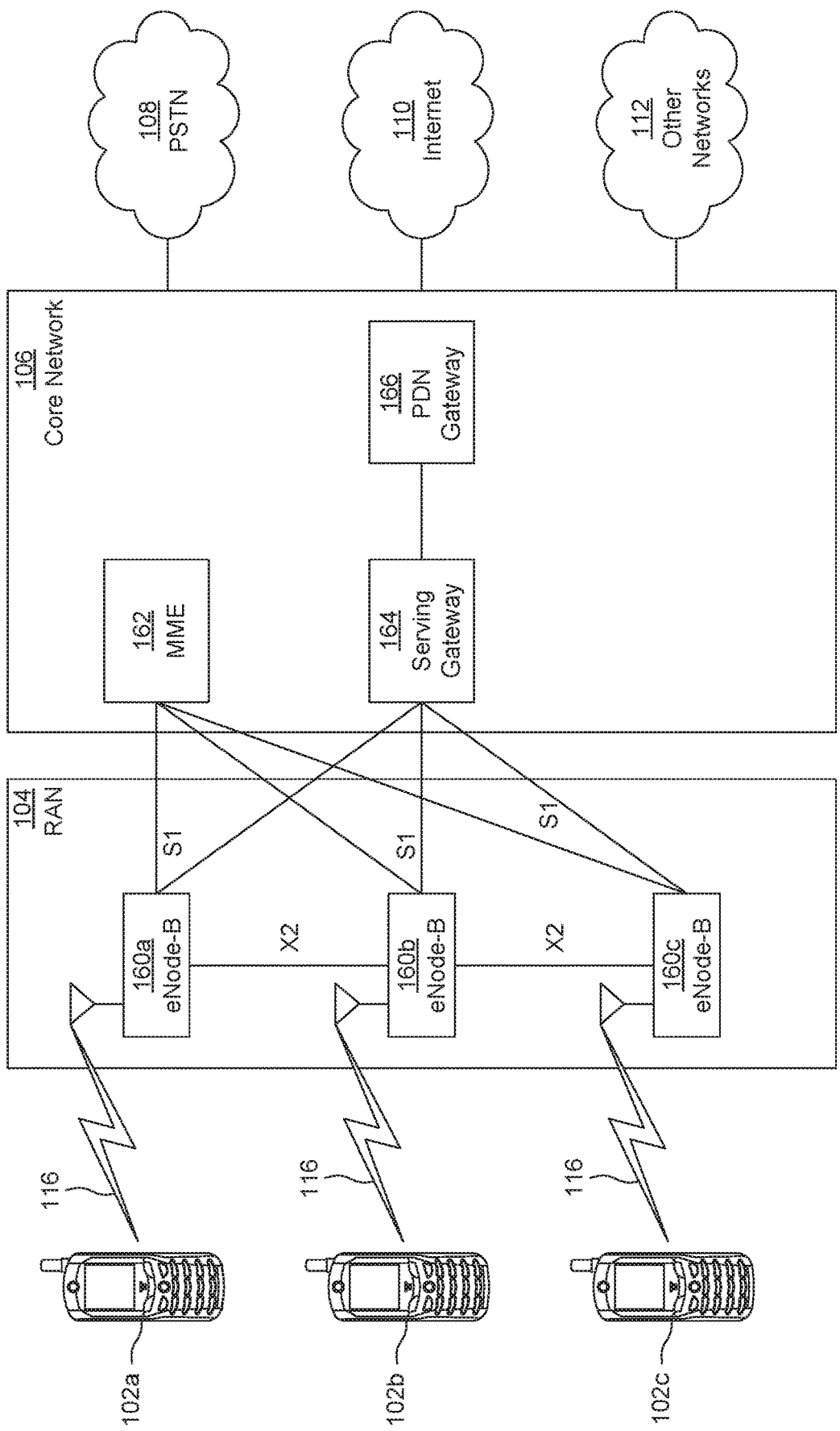
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
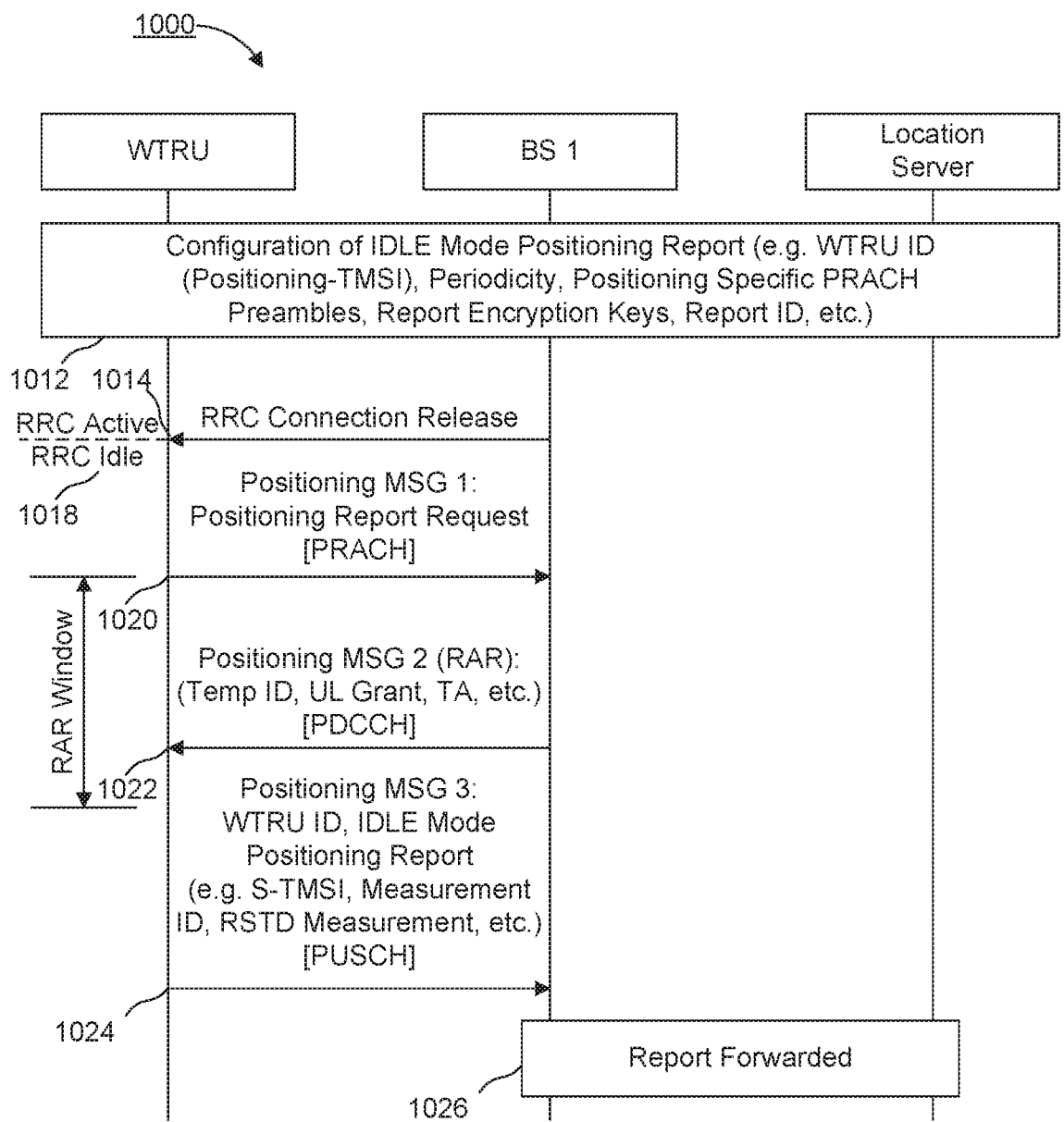
FIG. 10 is a diagram illustrating an example of a signaling exchange for a two-message idle/inactive mode positioning measurement reporting using PRACH and PUSCH.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
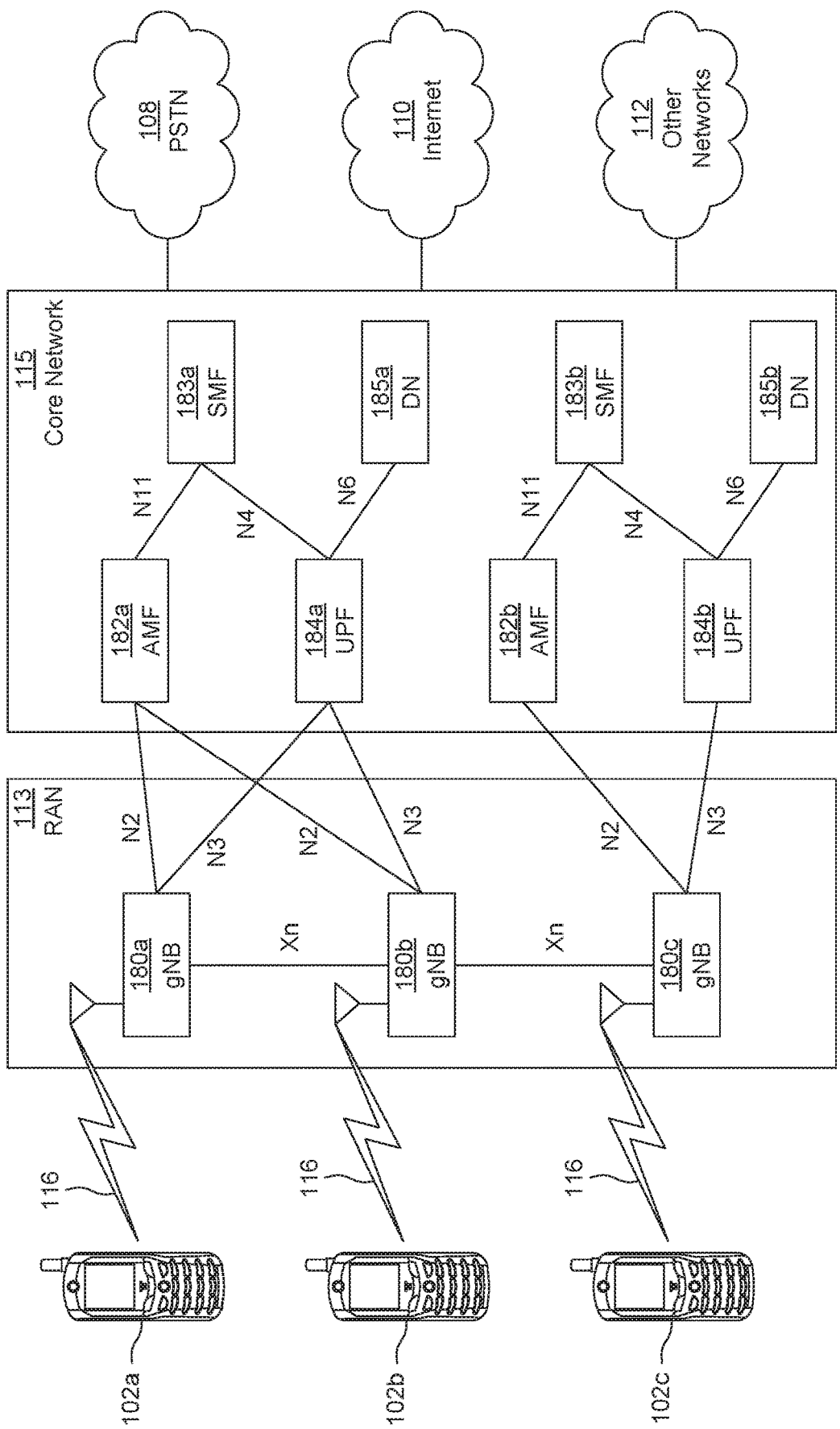
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Positioning Systems and Technologies

Positioning may allow a position (e.g., geographical location) of a WTRU to be determined. In many location applications, accurate positioning may be achieved through combination of a plurality of technologies, including for example any of: 1) global navigation satellite system (GNSS) based solutions, providing accurate location in outdoor scenarios, 2) radio-technologies providing a plurality of design options to locate a device (e.g. any of LTE networks, Wi-Fi networks, terrestrial beacon systems (TBS), Bluetooth, etc.), 3) inertial measurement units (IMU) or sensors (e.g. tracking a (e.g. user) position based on any of accelerometers, gyroscopes, magnetometers and vertical positioning by means of atmospheric pressure sensors, etc.).

The following terminology is used herein for the devices and/or network elements nodes (e.g., a WTRU, a gNB, etc. . . . ) involved in positioning: when appended to a network element, the suffix "-based" means that the network element may be capable of calculating the position; the network element may also provide measurements. When appended to a network element, the suffix "-assisted" means that the node may provide measurements and may not perform the position calculation.

Two (e.g., main) types of positioning may be supported, namely, WTRU positioning and network positioning.

For WTRU positioning, the WTRU may (e.g. actively) support or assist in the calculation of its (e.g. geographical) position. WTRU positioning may include: WTRU-assisted positioning and WTRU-based positioning. In WTRU-assisted positioning, the WTRU may perform (e.g., make) measurements and may provide them to a device connected to the network. The network device (e.g. an enhanced serving mobile location center, E-SMLC) may use these measurements to calculate the position of the WTRU. In WTRU-based positioning, the WTRU may make measurements, (and instead of or in addition to reporting the measurements to a network device), may perform the position calculations and may provide (e.g., transmit) the WTRU calculated position to the network (e.g. a network device or a set of interconnected network devices).

For network positioning, the network (e.g., a network device or a set of interconnected network devices) may use measurements or signals (e.g., received) from a WTRU to determine the position of that WTRU.

According to embodiments, WTRU positioning may include and/or be carried out using any of a GNSS method, an observed time difference of arrival (OTDOA) method (which may be referred to herein as an "downlink positioning" method), an enhanced cell ID (E-CID) method, and modified versions thereof.

According to embodiments, network positioning may include and/or be carried out using a time difference of arrival (UTDOA) method (which may be referred to herein as an "uplink positioning" method), and the like along with modified versions thereof.

Example Global Navigation Satellite System Method

As used herein, the GNSS method may refer to a generic satellite-based positioning method (that uses any of GPS, Galileo, GLONASS, BeiDou, etc. satellite systems). Network-assisted GNSS methods may rely on signaling between WTRU GNSS receivers (possibly with reduced complexity) and a (e.g., continuously) operating GNSS reference receiver network, which may have clear sky visibility of the same GNSS constellation as assisted WTRUs. According to embodiments, two assisted modes may be supported, namely, WTRU-assisted and WTRU-based modes.

WTRU-assisted mode: The WTRU may perform GNSS measurements (e.g. any of pseudo-ranges, pseudo Doppler, carrier phase ranges, etc.) and may send these measurements to the network (e.g. a network device or a set of interconnected network devices) where the position calculation may take place;

WTRU-based mode: The WTRU may perform GNSS measurements and may calculate its own position (e.g. location), possibly using additional measurements from other (e.g., non GNSS) sources and/or assistance data from the network (e.g. a network device or a set of interconnected network devices). The assistance data content may vary depending on whether the WTRU operates in WTRU-assisted or WTRU-based mode.

Example Observed Time Difference of Arrival (OTDOA) Positioning Method—Downlink Positioning According to embodiments, in an OTDOA positioning method, a WTRU may receive signals from a (e.g., reference) cell (e.g., typically the serving cell) and several (e.g., neighbor) cells. The WTRU may measure the (e.g., observed, detected) time differences of arrival of these signals (e.g., between any neighbor cell and the reference cell) and may report the reference signal time differences (RSTD) back to the network (e.g. a network device or a set of interconnected network devices). From a knowledge of the positions (e.g., locations) of the cells, fixed timing differences among them, and possibly other information, the network device (or set of devices) may derive the WTRU position by, for example, triangulation (e.g., considering at least three cells are measured) and/or other kinds of methods.

Figure 2:
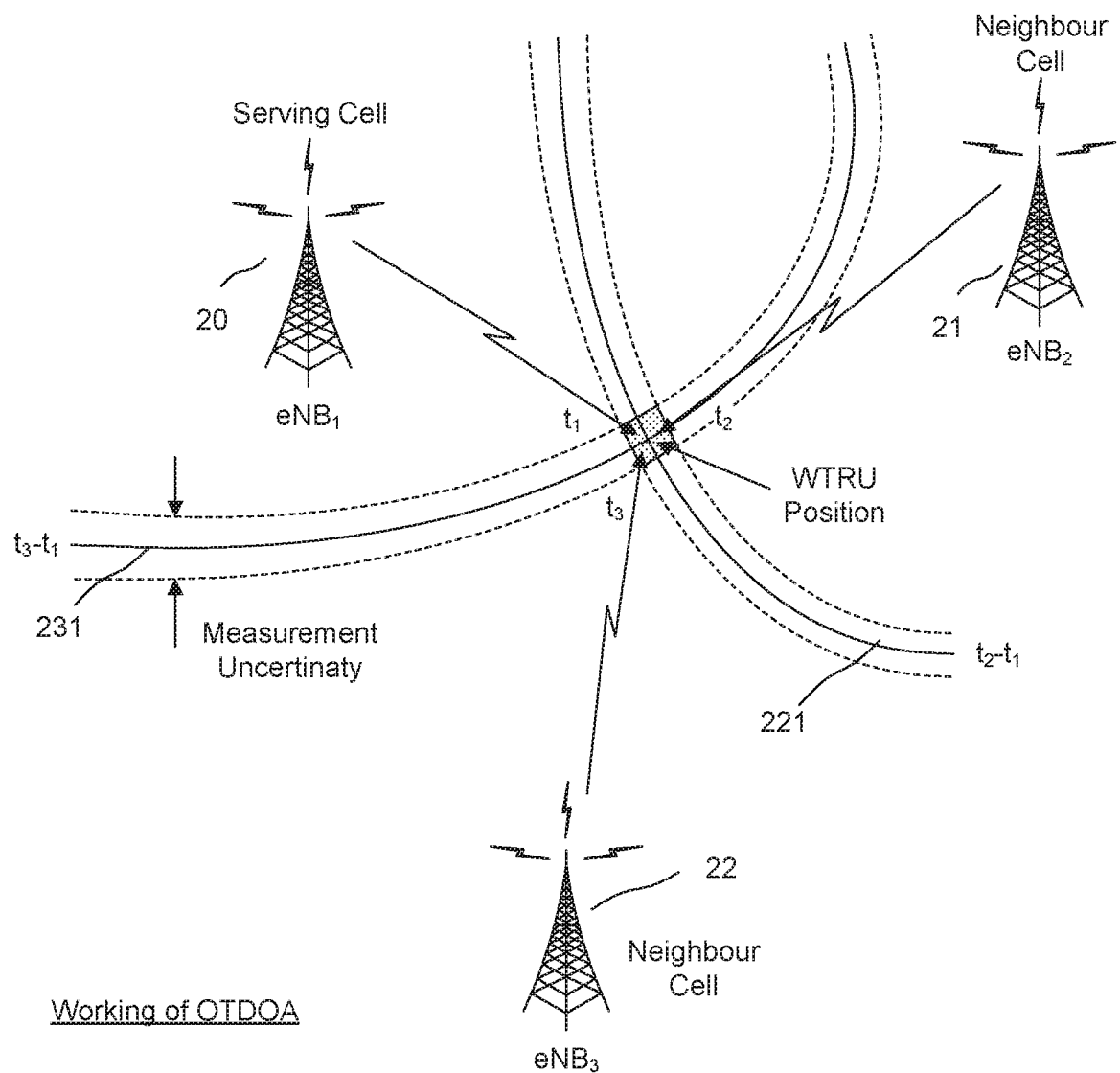
FIG. 2 a system diagram illustrating an example of positioning based on Observed Time Difference of Arrival.

FIG. 2 is a system diagram illustrating an example of positioning based on an OTDA method. Any time difference of arrival t3–t1, t2–t1, may determine a hyperbola 231, 221 of candidate positions. A first hyperbola 231 may correspond to candidate positions of network elements that may have measured an OTDA between the reference cell 20 and a first neighboring cell 21. A second hyperbola 221 may correspond to candidate positions of network elements that may have measured an OTDA between the reference cell 20 and a second neighboring cell 22. The intersection of the first and second hyperbolas 231, 221 may be the estimated WTRU position 200. At least three timing measurements t1, t2, t3 (from, for example, a reference 20 and two neighbor cells 21, 22) may allow the position (e.g., coordinates) of the WTRU to be obtained (e.g., estimated).

The time difference of arrival may be measured on a (e.g., pre-determined, known) signal. A cell-specific reference signal (CRS), which may be transmitted by any cell 20, 21, 22 and may be known to any WTRU, may be a candidate for this measurement. A positioning reference signal (PRS) may be used as well, e.g., to improve the accuracy of the OTDA method.

According to embodiments, a WTRU may use the CRS and/or the PRS to obtain time differences of arrivals. For example, by detecting the specific RS and/or PRS from a base station (BS), the WTRU may obtain a time of arrival (TOA) of the subframe containing the specific RS and/or PRS. In the embodiments described herein, a base station may be, for example, any of an eNB and a gNB. Time difference of arrival (TDOA) with respect to a neighboring cell 21, 22 may be calculated by subtracting the TOA of that neighboring cell 21, 22 from the TOA of the reference cell 20. According to embodiments, a WTRU may perform cross-correlation with (e.g., known) sequence to determine TOA of CRS and/or PRS from the BS. The WTRU may obtain two TOAs for respectively two BSs. The WTRU may obtain a TDOA by calculating the difference between both TOAs, after accounting for different schedules for the CRS/PRS from the different BSs.

Example Enhanced Cell ID (E-CID) Positioning Method

The E-CID positioning method builds upon a cell ID (CID) method. The CID method refers to a network-based positioning method in which the network (e.g. a network device or a set of interconnected network devices) may use knowledge of which cell is the serving cell of the WTRU to determine the position of the WTRU. The E-CID positioning method may improve the accuracy of the position by combining knowledge of the cell with measurements made by the WTRU and the network, such as, for example, any of a measurement of the round trip time (RTT) providing distance information, angle of arrival AOA/angle of departure (AOD) measurements providing direction information, and reference signal received power (RSRP) measurements that may provide additional information. The E-CID positioning method may involve, for example one to at least three base stations. The measurements may be performed at the WTRU and/or at the BS and may be reported to a (e.g., location) server, where, for example, the position of the WTRU may be calculated.

Example Uplink Time Difference of Arrival (UTDOA) Positioning Method—Uplink Positioning According to embodiments, the uplink positioning method (e.g., UTDOA) may make use of (e.g., measured, observed, detected) timings at a plurality of network location measurement units (LMU), of uplink signals transmitted from a WTRU. The LMU may measure the timing of the received signals using, for example, assistance data received from the positioning server. The resulting measurements may be used to obtain (e.g., determine, estimate) the position of the WTRU.

New use cases and/or applications for 5G systems may drive more stringent location expectations as compared to legacy wireless systems. For example, a WTRU may need to be located with an accuracy of 0.3 m and a positioning service latency of 10 ms.

According to embodiments, positioning methods may allow a position of a WTRU to be obtained with an accuracy location capability equaling, for example, at least 0.3 m and with a latency of, for example, at most 10 ms. Positioning services may also be useful in some NR use cases, for example, where the WTRU's power may be limited. Such NR use cases may include, for example, any of massive machine type commutations (mMTC) and vehicle to anything (V2X) applications.

Reducing computation complexity and/or time of positioning methods may in turn reduce power consumption (e.g., positively impacting a charge and/or life of a WTRU's battery). WTRUs may connect with limited durations to limit attendant power consumption and maintain battery life/charge time and may have limited signaling opportunities to transmit positioning indications. Positioning methods supporting WTRU positioning while in radio resource control (RRC) idle/inactive mode may enable a WTRU positioning and tracking for power limited WTRUs. Positioning methods supporting WTRU positioning while in RRC idle/inactive mode may increase the accuracy of the positioning methods.

Limited (e.g., strict) latency for positioning measurement updates may be useful in several NR use cases. For example, establishing an RRC connection before providing reports (e.g., transmitting information indicating measurements) may incur additional reporting latency. Supporting positioning reports for WTRUs directly from RRC idle/inactive mode may enable latency reduction in NR positioning measurement and reporting (e.g. transmission of measurement reports).

According to embodiments, a measurement may be identified by a (e.g., unique) identifier (ID), which may be referred to herein as "measurement ID". According to embodiments, a WTRU may be configured to perform a plurality of measurements. A measurement ID may identify a specific measurement among a set of measurements.

According to embodiments, a measurement report may be identified by a (e.g., unique) identifier (ID), which may be referred to herein as "measurement report ID". According to embodiments, a WTRU may be configured to perform a plurality of measurement reporting. A measurement report ID may identify a specific measurement report among a set of measurements reports between the network and the WTRU. The measurement report ID, when transmitted by the WTRU to the network may enable the identification of the reporting configuration.

According to embodiments, a WTRU may be identified by a (e.g., unique) identifier (ID), which may be referred to herein as any of WTRU ID, WTRU identifier, WTRU specific ID. The WTRU ID may be used to (e.g., uniquely)

identify a WTRU (e.g., in a tracking area). The WTRU ID may be managed by the network (e.g., any of AMF and MME) and may not be deleted in case the WTRU moves to idle/inactive state (e.g., while remaining in the same tracking area). According to embodiments, a WTRU ID may be any of a system architecture evolution temporary mobile subscription identifier (S-TMSI), a 5G-S-TMSI, and a Positioning-TMSI (P-TMSI).

According to embodiments, a WTRU may be temporarily identified by a temporary identifier, for example, for the purpose of encoding and decoding transmissions between a WTRU and a BS. A temporary WTRU identifier may be any of a cell radio network temporary identifier (C-RNTI), a temporary cell RNTI (T-CRNTI), a random access RNTI (RA-RNTI), a temporary positioning RNTI (TP-RNTI). A TP-RNTI may be temporarily allocated by a (e.g., reference) BS for the purpose of identifying transmissions between the (e.g., reference) BS and the WTRU. The TP-RNTI may be local to (e.g., managed, allocated by) any of an AMF, an MME, a positioning server and a gNB. The TP-RNTI may, for example, (e.g., uniquely) identify a WTRU (e.g., within a tracking area).

Downlink Positioning Measurement and Configuration Examples

According to embodiments, while in active (e.g., RRC connected) mode a WTRU may be configured by (e.g., receiving a configuration information from) the BS to (e.g., apply the configuration information to) perform a DL positioning measurement. For example, the WTRU may be configured to make and/or be scheduled to make the measurements in any WTRU RRC state (e.g., connected, idle, inactive). The DL positioning measurements may be made using reference signals (RS) received from serving and/or neighboring BSs on any of a periodic, semi-periodic and aperiodic basis. A WTRU may make use of the RS to obtain (e.g., estimate) a variety of parameters related to WTRU positioning (e.g. any of a RTT, AOA, RSTD, etc.). The WTRU may obtain a positioning (e.g., estimate) using broadcast RS transmitted by (e.g., received from) one or any number of BSs. The RS may include reference signals that may be broadcast or otherwise transmitted/received from the BS (e.g., any of a primary synchronization signal (PSS), secondary synch signal (SSS), demodulation reference signal (DMRS) in a common physical downlink control channel (PDCCH), CRS, PRS, etc.). According to embodiments, transmission of RS by BSs may, for example, occur in time coordination with other transmitting BSs (e.g., any of simultaneously, synchronously, asynchronously, etc.). According to embodiments, transmission of RS from different BSs may occur in a common band, or across a plurality of bands. According to embodiments, measurement of the (e.g., transmitted) RS may be configured by the (e.g., network/serving) BS according to a (e.g., desired) schedule (e.g. any of periodically, aperiodic, semi-periodically, etc.). In other words, the WTRU may be configured with receiving configuration information, which information may indicate a time schedule according to which RS may be transmitted (and, in turn, measured). According to embodiments, a measurement observation may be configured at the same or a different schedule as that of the RS transmission. For example, the measurement observation may be configured as a subset (e.g. a part of) the total RS transmission (e.g., any of every other transmission, every third transmission, etc.) Schedule periodicity may be maintained by a variety of methods (e.g., any of a System Frame Number (SFN), internal WTRU clock, GNSS/GPS synchronized clock). The WTRU may be configured (e.g., receiving a configuration information) to, and may, store one or multiple measurements while in idle/inactive mode (e.g., store last N measurements, N being an integer value).

According to embodiments, a WTRU in idle/inactive mode may monitor any of the broadcast channels, (e.g., such as any of the common PDCCH or physical broadcast control channel (PBCH) for receiving an indication that the WTRU may initiate an RRC connection (e.g., any of a CN- or RAN-paging). According to embodiments, the WTRU may initiate (e.g., transmit) an RRC connection request through a traditional random-access channel (RACH) procedure (e.g., any of a 2-step and a 4-step RACH procedure). In case the WTRU is in RRC connected mode, the WTRU may be reconfigured (e.g., receiving information indicating) to terminate or alter its idle/inactive mode positioning measurements (e.g., operable as the WTRU is in idle/inactive mode) through any conventional RRC and/or location services protocol messaging.

Figure 3:
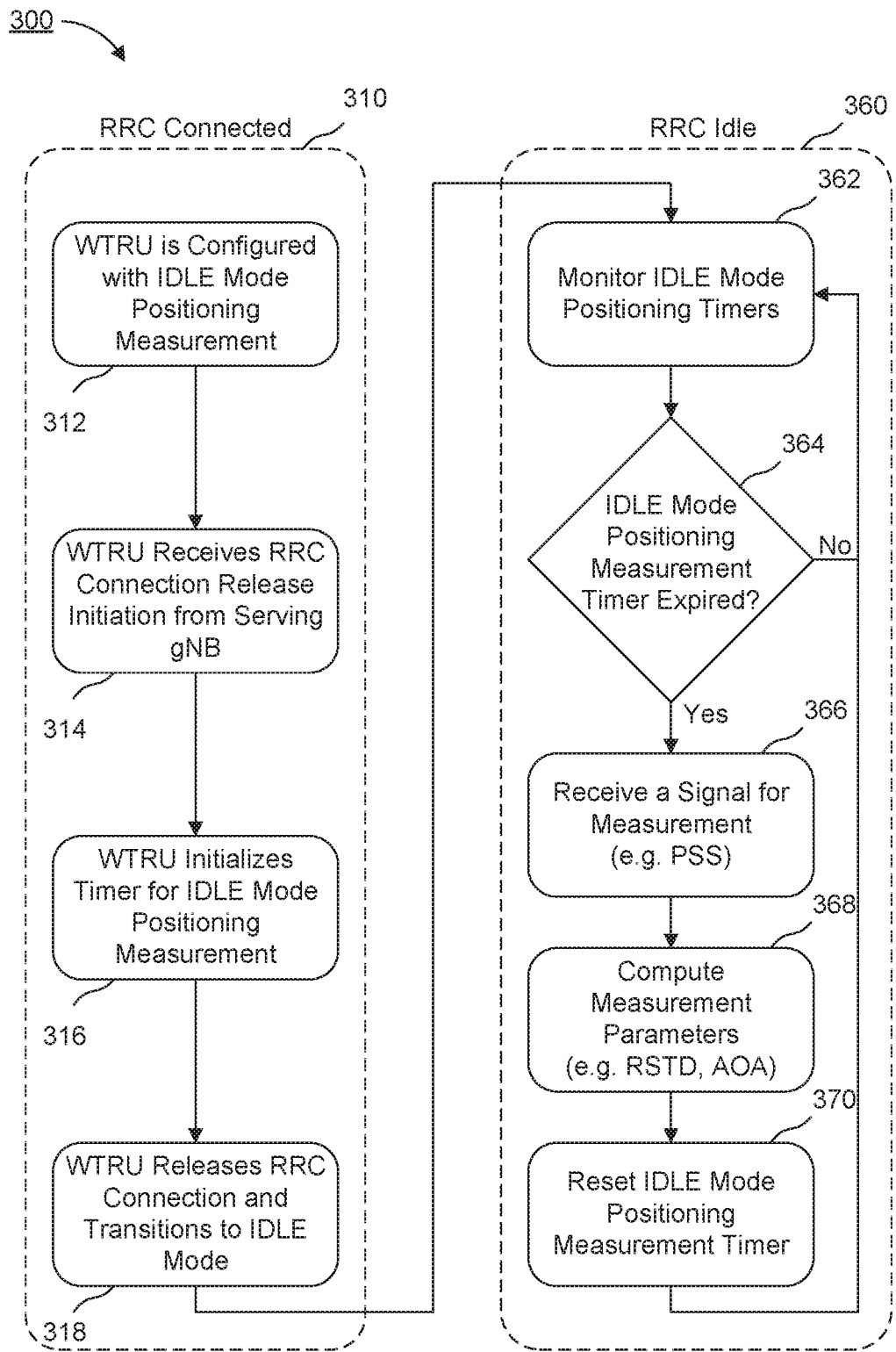
FIG. 3 is a diagram illustrating an example of idle/inactive mode positioning measurement.

FIG. 3 is a diagram illustrating an example of procedure 300 for idle/inactive mode positioning measurement. For the sake of clarity and conciseness, "IDLE mode positioning measurement" may be used herein interchangeably with "idle/inactive mode positioning measurement".

With reference to FIG. 3, in a step 312, a WTRU in RRC connected mode 310 may be configured by the serving BS to perform a (e.g., periodic) IDLE mode positioning measurement. In a step 314, the WTRU may receive an RRC connection release command from the serving BS. In a step 316, the WTRU may initialize an (e.g., IDLE mode positioning measurement) timer (e.g., corresponding to the idle/inactive mode positioning configuration received from the BS). In a step 318, the WTRU may receive a release RRC connection message and may transition to an idle/inactive state 360. In a step 362, the WTRU may monitor the (e.g., IDLE mode positioning measurement) timer. In a step 364, it may be determined whether the (e.g., IDLE mode positioning measurement) timer expired. At or after expiration of the timer, in a step 366, the WTRU may receive a signal for measurement (e.g., any of a RS, a PRS, a Primary Synchronization Signal (PSS), a Secondary Synchronization Signal (SSS)) from any of the (e.g. observed) BSs broadcast transmissions. In a step 368, the WTRU may compute a positioning measurement parameter (e.g., value) from the received signal. The WTRU may compute measurements such as, for example, any of a RSTD between neighboring BSs and an AOA of a (e.g., received, measured) RSs. In case the WTRU completed the positioning measurement, for example, according to the configured observation measurement schedule (e.g., period), in a step 370, the WTRU may reinitialize the IDLE mode positioning timer and may resume idle/inactive mode procedures (e.g., the WTRU may transition to the step 362).

Figure 4:
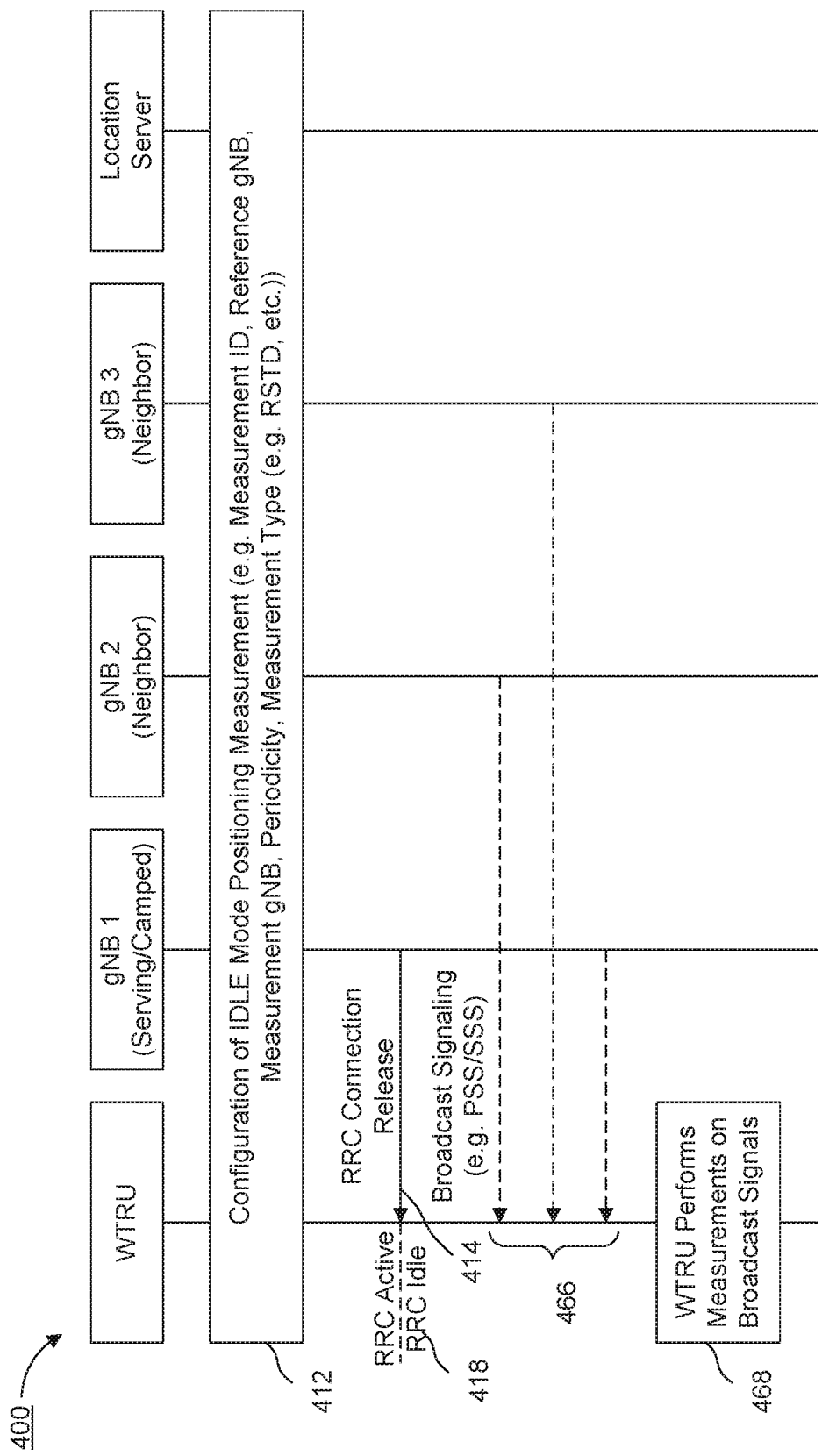
FIG. 4 is a diagram illustrating an example of a signaling exchange for idle/inactive mode positioning measurement.

FIG. 4 is a diagram illustrating an example of a signaling for idle/inactive mode positioning measurement 400. Configuration information for configuring the WTRU to perform an idle/inactive mode positioning measurement, may be received by the WTRU in an RRC connected mode 412. The configuration information may include any of a measurement ID, a type of signal (e.g., any of RS, PRS, PSS, SSS, etc. . . . ) on which measurements may be performed, reference and neighboring (e.g., measurement) BSs, measurement types (e.g., any of RTT, RSTD, AOA, etc. . . . ) and schedule information (e.g. any of periodic, semi-periodic, aperiodic timing information) indicating time intervals during which the WTRU may perform positioning measurements. The WTRU may receive an RRC connection release 414 and may go (e.g., transition) to any of idle/inactive mode 418. The WTRU may receive broadcast signals (e.g., PSS, SSS) 466, on which the WTRU may perform measurements 468 according to any embodiment of the configured idle/inactive mode positioning measurement.

Downlink Positioning Measurement Reporting and Configuration Examples

According to embodiments, while in active (e.g., RRC connected) mode a WTRU may be configured to transmit a DL positioning measurement report to a BS. The report may be scheduled and/or transmitted in any WTRU RRC state (e.g. connected, idle, inactive). The report may include and/or indicate information on measurements made from one or many configured idle/inactive mode positioning measurements that may have been configured. The measurement reports may be configured to be and may be transmitted on any of a periodic, semi-periodic, and aperiodic basis.

According to embodiments the schedule periodicity may be maintained by a variety of methods (e.g. any of SFN, internal WTRU clock, GNSS/GPS synchronized clock). A WTRU may trigger, be triggered to provide and/or provide (e.g. transmit) a positioning measurement report based on a (e.g., pre-configured) network event observed by the WTRU (e.g. any of the WTRU leaving its tracking area ID, the WTRU reselecting a new BS, etc.) The WTRU may trigger, be triggered to provide and/or provide (e.g. transmit) a positioning measurement report based on broadcast indication received from the BS (e.g. System Information Block (SIB) indication of desired measurement reporting ID's, etc.). The WTRU may be configured to, and may, provide (e.g., transmit) any of one, multiple, a (e.g. mathematical) function of multiple measurements in a report (e.g. transmit a report with any of one measurement, last N measurements, average of last N measurements, etc.). A WTRU may be configured with a WTRU specific identifier (ID) for measurement reporting. The WTRU specific ID may be unique within a region of the network coverage area (e.g. serving BS, tracking area, PLMN, etc.). The WTRU measurement report may be configured with one or many measurement report IDs.

One-Message Reporting Using RACH Preamble Examples

According to embodiments, a WTRU may be configured to trigger, be triggered to transmit and/or transmit its measurement report in an (e.g., available) Physical RACH (PRACH). A (e.g., target) PRACH may be selected by the WTRU according to one or more of various criteria (e.g. any of strongest associated PSS signal strength, first available PRACH after configured measurement indication, etc.).

According to embodiments, a WTRU may trigger, be triggered to transmit and/or transmit the report over the PRACH using a RACH preamble. The RACH preamble message may be WTRU specific, or available for random access. The available set of RACH preambles may be configured for the WTRU while in active (e.g., RRC connected) mode, or provided as system information (SI), which may broadcast by or requested from the BS monitoring the target PRACH resource. According to embodiments, the RACH preamble may be associated with the WTRU specific ID (e.g., RACH preamble seed may be a function of the WTRU specific ID, etc.). According to embodiments, the RACH preamble may be associated with the WTRU measurement ID (e.g., a cyclic shift of the RACH preamble may be calculated as a function of the measurement ID, etc.). According to embodiments, the measurement value of the measurement report may be associated with the RACH preamble generation (e.g., a binary sequence that modulates the RACH preamble, may be XOR'd with the measurement report field, etc.). According to embodiments, the generated positioning RACH preamble may be transmitted in the target RACH preamble, and may be received by one or more multiple Transmission/Reception Points (TRPs). The positioning RACH preamble may be received by one or multiple BSs.

Figure 5:
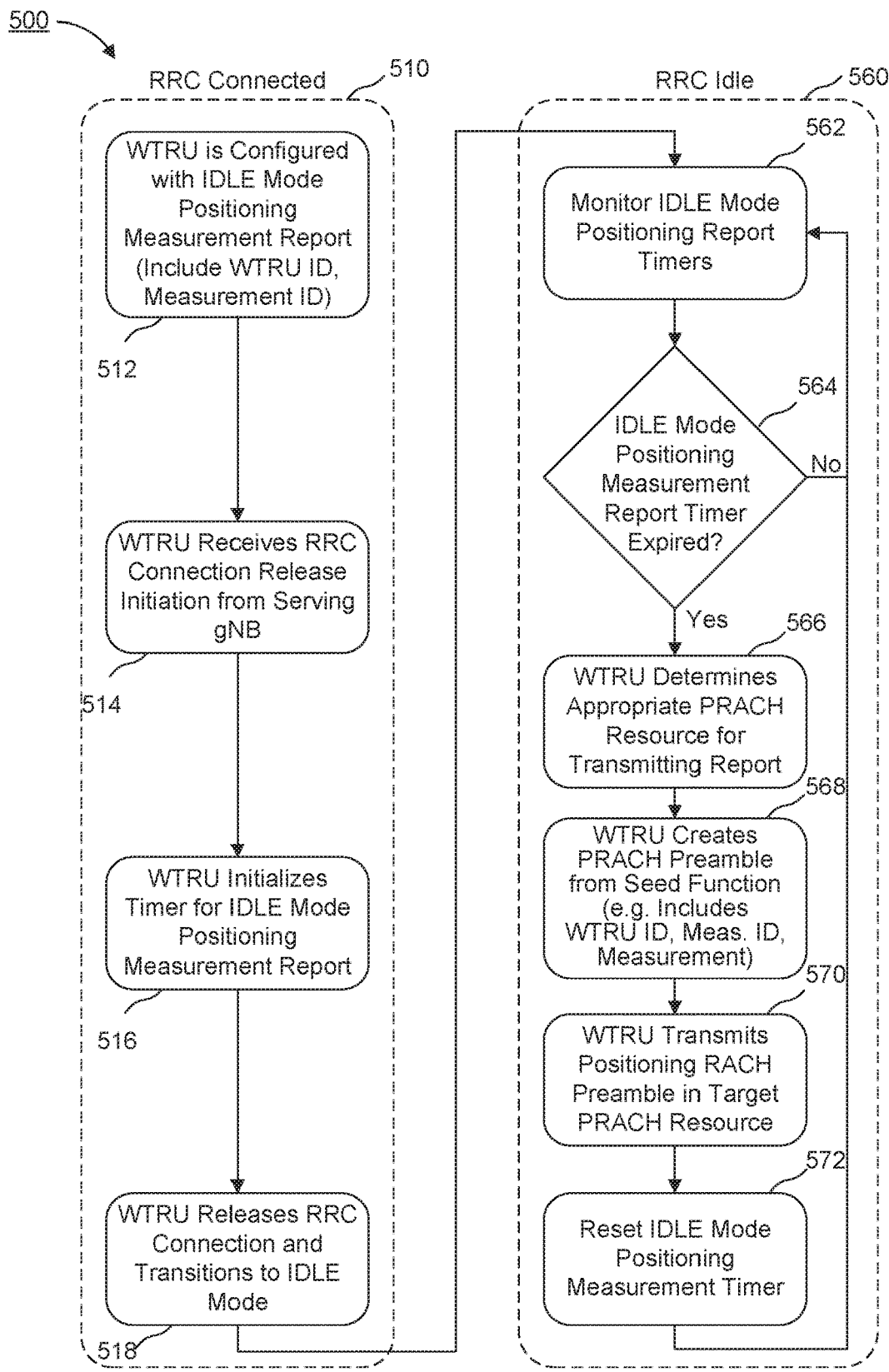
FIG. 5 is a diagram illustrating an example of one-message positioning reporting using RACH preamble.

FIG. 5 is a diagram illustrating an example of one-message positioning reporting procedure 500 using a RACH preamble. In a step 512, a WTRU may be configured with an IDLE mode positioning measurement report (e.g., for reporting measurements in idle/inactive mode). For example, a WTRU may receive a periodic WTRU positioning measurement report configuration while in RRC connected mode 510. The positioning measurement report configuration may include, for example, a WTRU (e.g., specific) ID unique with a positioning region (such as e.g. a S-TMSI), and a measurement report ID. In a step 514, the WTRU may receive an RRC connection release initiation message from the serving BS. In a step 516, the WTRU may initialize a (e.g., WTRU IDLE mode positioning measurement report) timer. In a step 518, the WTRU may receive a release RRC connection message and may transition to an idle/inactive state 560. In a step 562, the WTRU may monitor the (e.g., IDLE mode positioning report) timer. In a step 564, it may be determined whether the (e.g., IDLE mode positioning report) timer expired. In a step 566, upon or after timer expiry, the WTRU may select the (e.g., appropriate) PRACH resource for transmitting its positioning measurement report (e.g. a next available PRACH determined by, for example, a Synchronization Signal Block (SSB) monitoring). In a step 568, the WTRU may generate a positioning RACH preamble (e.g., uniquely) associated with its WTRU specific ID and/or measurement ID. The RACH preamble may be generated, for example and without limitation, from a pseudo-random sequence and using a seed that may be determined as a function of any of a variable, including any of a WTRU ID, a measurement ID and an average of last N measured positioning values. In a step 570, the WTRU may transmit the (e.g., generated) RACH preamble in the (e.g., target) PRACH resource. In a step 572, the WTRU may re-initialize the positioning measurement report timer and may resume idle/inactive mode procedures (e.g., the WTRU may transition to the step 562).

Figure 6:
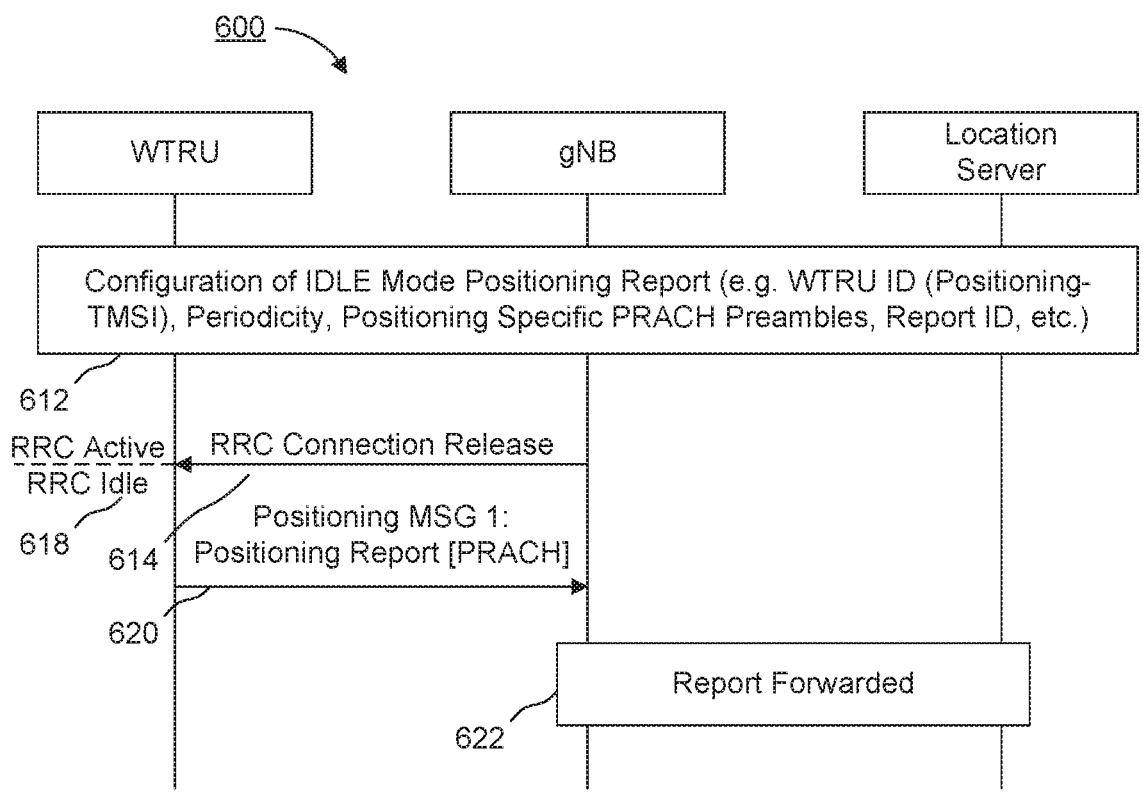
FIG. 6 is a diagram illustrating an example of a signaling exchange for preamble-based positioning measurement reporting.

FIG. 6 is a diagram illustrating an example of a signaling exchange for preamble-based positioning measurement reporting 600. Configuration information for configuring the WTRU to perform idle/inactive mode positioning reporting, may be received by the WTRU in an RRC connected mode 612. The configuration information may include any of a WTRU ID (e.g. Positioning-TMSI), a periodicity (e.g., time intervals during which the WTRU may perform positioning measurement reporting), positioning specific PRACH preambles, a measurement report ID, etc.). The WTRU may receive an RRC connection release 614 and may go (e.g., transition) to any of idle/inactive mode 618. The WTRU may transmit a positioning measurement report 620 to a BS in RACH preamble according to the configured periodicity and/or according to any embodiment disclosed herein. The BS may forward 622 the positioning measurement report to a location server.

One-Message Reporting Appended to a RACH Preamble Examples

According to embodiments, a WTRU may be configured to transmit its measurement report in an (e.g., available) PRACH. The (e.g., target) PRACH may be selected by the WTRU according to one or more of various criteria (e.g., any of a strongest associated PSS strength, a first available PRACH after configured measurement indication, etc.).

According to embodiments, a WTRU may transmit its positioning measurement report by any of encoding, modulating and appending the report to (e.g., the end of) a RACH preamble to be transmitted within a (e.g., selected) PRACH resource. According to embodiments, the RACH preamble may indicate the presence of an appended report (e.g. unique positioning-based RACH preamble). According to embodiments, the RACH preamble may have an association with the WTRU (e.g. RACH preamble generated as function of S-TMSI). According to embodiments, the RACH preamble may be shared by a plurality of WTRUs within a PRACH resource. According to embodiments, the WTRU measurement report may include any of one or multiple relevant report fields (e.g., any of a WTRU specific ID, a measurement report ID, one or several measurements, etc.). According to embodiments, the data may be appended with a cyclic redundancy check computed on the data to be transmitted. According to embodiments, the measurement report may be prepared for transmission by any of the following procedures: 1) the measurement report may be encoded by a variety of encoding techniques (e.g. any of polar, low density parity check (LDPC), etc.); 2) the measurement report may be scrambled by one or multiple scrambling sequences (e.g. pseudo-random sequence generation (PRSG), etc.); 3) the measurement report may be modulated by one or multiple mapping methods (e.g. quadrature phase-shift keying (QPSK), M-ary quadrature amplitude modulation (QAM), etc.); 4) the modulated measurement report may be appended with the RACH preamble by multiplexing in a variety of methods (e.g. time and/or frequency); and 5) the appended RACH preamble and measurement report may be transmitted in the target PRACH resource.

Figure 7:
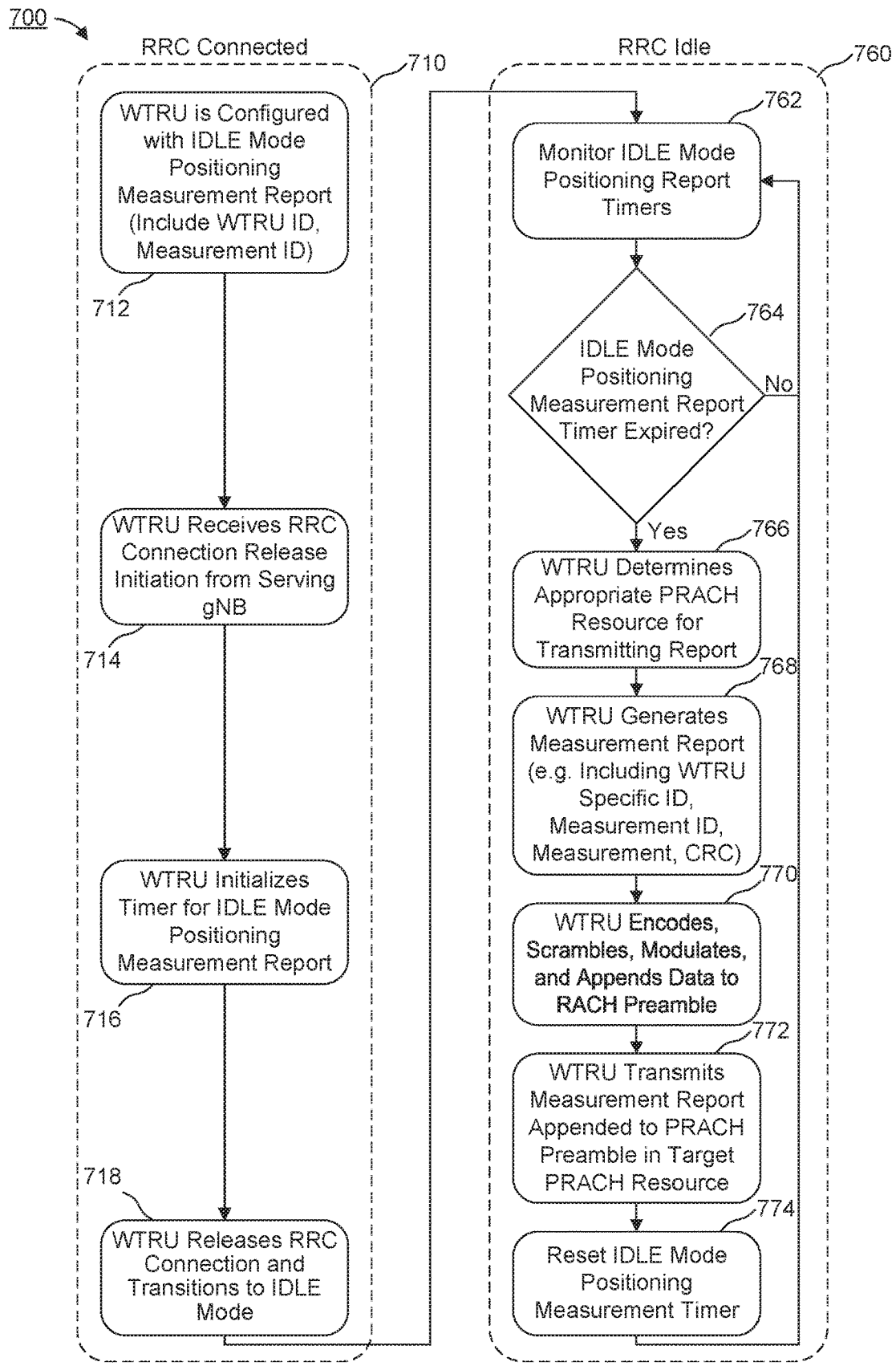
FIG. 7 is a diagram illustrating an example of one-message downlink positioning measurement reporting having a report appended to a PRACH preamble.

FIG. 7 is a diagram illustrating an example of one-message downlink positioning measurement reporting procedure 700 having the report appended to a PRACH preamble. In a step 712, a WTRU may be configured with an IDLE mode positioning measurement report (e.g., for reporting measurements in idle/inactive mode). For example, the WTRU may receive a periodic WTRU measurement report configuration while in RRC connected mode. The measurement report configuration may include any of a WTRU specific identifier (ID) (e.g., unique with a positioning region (e.g. S-TMSI)), and a measurement report ID. In a step 714, the WTRU may receive an RRC connection release message from the serving BS. In a step 716, the WTRU may initialize a WTRU (e.g., IDLE mode positioning measurement report) timer. In a step 718, the WTRU may receive a release RRC connection message and may transition to an idle/inactive state 760. In a step 762, the WTRU may monitor the (e.g., IDLE mode positioning report) timer. In a step 764, it may be determined whether the (e.g., IDLE mode positioning report) timer expired. In a step 766, upon or after timer expiry, the WTRU may select a (e.g., appropriate) PRACH resource for transmitting its positioning measurement report (e.g. next available PRACH determined by SSB monitoring). In a step 768, the WTRU may generate a positioning measurement report by appending the (e.g., relevant) fields (e.g. any of a WTRU specific ID, a measurement ID, one or multiple measurement values, a CRC). In a step 770, according to embodiments, the WTRU may encode the data, e.g., using a polar and/or other encoding algorithm. According to embodiments, the WTRU may scramble the data using, for example, a PRSG generated, for example, from a function of, for example, its own Cell Radio Network Temporary Identifier (C-RNTI). According to embodiments, the WTRU may modulate the data as (e.g., QPSK) symbols and may multiplex the data in time with the RACH preamble (e.g., the data may be appended to the RACH preamble). In a step 772, the WTRU may transmit the RACH preamble appended with the positioning measurement report in the (e.g., target) PRACH resource. In a step 774, the WTRU may reset its (e.g., IDLE mode positioning measurement report) timer and may resume the WTRU idle/inactive mode procedures (e.g., the WTRU may transition to the step 762).

Figure 8:
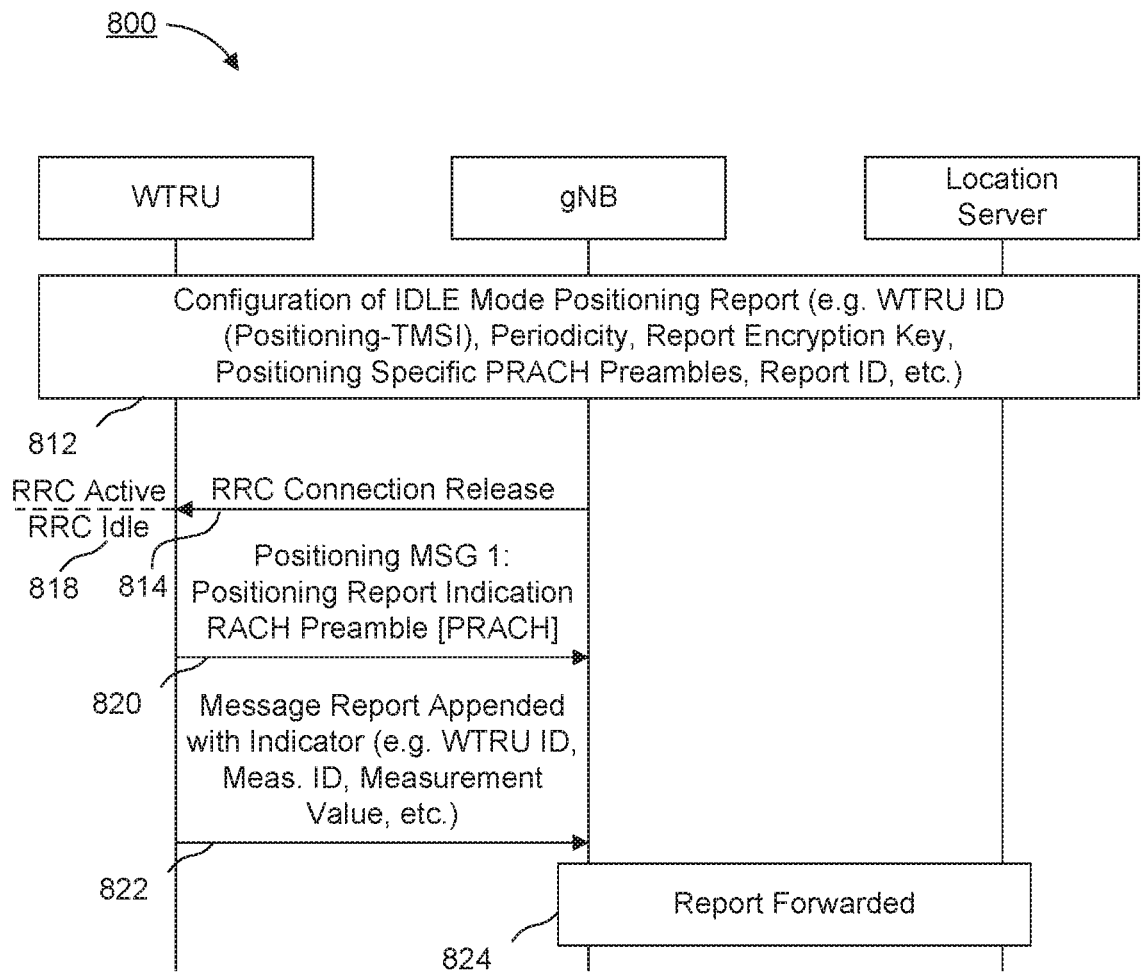
FIG. 8 is a diagram illustrating an example of a signaling exchange for idle/inactive mode positioning measurement reporting with the report appended to a RACH preamble.

FIG. 8 is a diagram illustrating an example of a signaling exchange for idle/inactive mode positioning measurement reporting with the report appended with a RACH preamble 800. In FIG. 8, a signal exchange may be carried out between the network and a WTRU in which the WTRU may provide (e.g., transmit) a one-message-based positioning report appended with RACH preamble (e.g., according to any disclosed embodiment). With reference to FIG. 8, configuration information for configuring the WTRU to perform idle/inactive mode positioning reporting, may be received by the WTRU in an RRC connected mode 812. The configuration information may include any of a WTRU ID (e.g. Positioning-TMSI) a periodicity (e.g., time intervals during which the WTRU may perform positioning measurement reporting), a report encryption key, positioning specific PRACH preambles, a measurement report ID, etc.). The WTRU may receive an RRC connection release 814 and may go (e.g., transition) to any of idle/inactive mode 818. The WTRU may transmit to a BS 820 a measurement report appended to a RACH preamble 822 according to the configured periodicity and/or according to any embodiment disclosed herein. The BS may forward 824 the positioning measurement report to a location server.

Two-Message Reporting Using PRACH and PUSCH Examples

According to embodiments, a WTRU may be configured to transmit its measurement report in an available PRACH. According to embodiments, the target PRACH may be selected by the WTRU according to any number of various criteria (e.g., any of a strongest associated PSS strength, a first available PRACH after configured measurement indication, etc.).

According to embodiments, a WTRU may transmit a RACH preamble in the target PRACH resource. According to embodiments, the selected RACH preamble may be transmitted as any of a contention-based and contention-free RACH preamble. According to embodiments, the RACH preamble may (e.g., uniquely) signal the WTRU intent to transmit an idle/inactive mode positioning report. According to embodiments, the available set of RACH preambles may be configured for the WTRU while in active (e.g., RRC connected) mode, or provided as system information (SI), which may be broadcast by and/or requested from the BS monitoring the target PRACH resource.

According to embodiments, after transmitting the RACH preamble the WTRU may monitor the common PDCCH for (e.g., receiving) a RACH response (RAR). According to embodiments, the RAR may include information indicating that the transmitted RACH preamble was received by the BS and may provide the WTRU with a temporary ID (e.g. T-CRNTI, etc.). According to embodiments, the RAR may include, include information indicating, indicate or otherwise provide (collectively "provides") a timing advance (TA) to configure uplink synchronization for the WTRU. The terms ""include", "include information indicating" "indicate" and "provide" may be used herein interchangeably. According to embodiments, the RAR may provide (e.g. include an information indicating) a reporting resource for the WTRU to transmit the positioning measurement report.

According to embodiments, the reporting resource may be any of WTRU-specific and/or common (e.g., shared). According to embodiments, the reporting resource may be transmitted on a separate physical channel (e.g. any of a physical uplink control channel (PUCCH), a physical uplink shared channel PUSCH, etc.). According to embodiments, the reporting resource may have a configured time relation relative to the RAR (e.g., any of N slots, M sub-frames, etc., N and M being integer values, for instance).

According to embodiments, the WTRU may transmit its positioning measurement in the configured reporting resource as provided/indicated in the RAR. According to embodiments, the measurement report may include one or multiple fields (e.g. any of a WTRU-specific ID, a measurement ID, one or multiple measurement values, a CRC, etc.). According to embodiments, the measurement report may be prepared for transmission by any of the following procedures: 1) the measurement report may be encoded by a variety of encoding techniques (e.g., polar, LDPC, etc.); 2) the measurement report may be scrambled by one or multiple scrambling sequences (e.g. PRSG, etc.); 3) The measurement report may be modulated by one or multiple mapping methods (e.g. QPSK, M-ary QAM, etc.); and 4) The measurement may be multiplexed (e.g. any of time, frequency, code multiplexing) with other physical channels (e.g. any of PUSCH, PUCCH, PRACH, etc.) as part of the uplink transmission, or the measurement report may be transmitted independently.

According to embodiments, the WTRU may reset its positioning measurement report timer and resume idle/inactive mode operations (e.g., immediately) after transmission. According to embodiments, the WTRU may monitor a PDCCH search space for acknowledgement of the measurement report transmission and may resume idle/inactive mode operations if (e.g., in case) an acknowledgement is received.

Figure 9:
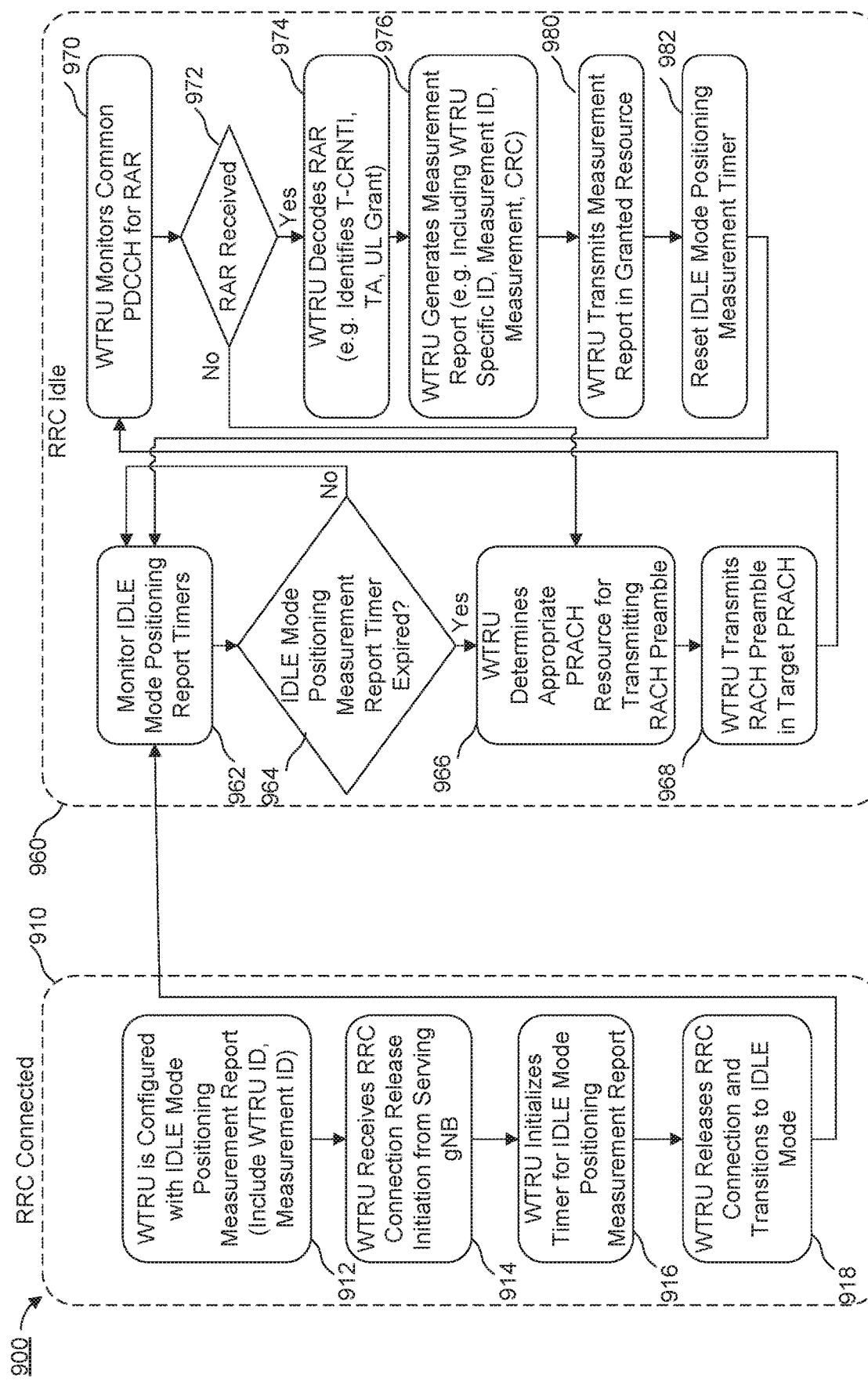
FIG. 9 is a diagram illustrating an example of a two-message downlink positioning measurement reporting using PRACH and PUSCH.

FIG. 9 is a diagram illustrating an example of a two-message downlink positioning measurement reporting procedure 900 using PRACH and PUSCH. In a step 912, a WTRU may be configured with an IDLE mode positioning measurement report (e.g., for reporting measurements in idle/inactive mode). For example, the WTRU may receive a periodic WTRU measurement report configuration while in RRC connected mode. According to the illustrated example, the measurement report configuration may include any of a WTRU (e.g., specific) ID (e.g., unique with a positioning region such as for example a S-TMSI), and a measurement report ID. In a step 914, the WTRU may receive an RRC connection release initiation message from the serving BS. In a step 916, the WTRU may initialize a (e.g., WTRU IDLE mode positioning measurement report) timer. In a step 918, the WTRU may receive a release RRC connection message and may transition to an idle/inactive state 960. In a step 962, the WTRU may monitor the (e.g., IDLE mode positioning report) timer. In a step 964, it may be determined whether the (e.g., IDLE mode positioning report) timer expired. In a step 966, the WTRU may select the (e.g., appropriate) PRACH resource for transmitting its positioning measurement report (e.g. next available PRACH determined by SSB monitoring), e.g. once the timer expires. The WTRU may select a positioning specific RACH preamble and, in a step 968, the WTRU may transmit it in the target PRACH resource. In a step 970, the WTRU may monitor the common PDCCH associated with the PRACH resource for (e.g., receiving, detecting) a RAR. In a step 972, it may be determined whether a RAR is received by the WTRU. In a step 974, the WTRU may decode the received RAR (e.g., indicating a T-CRNTI, a TA, an UL grant) and may synchronize its uplink transmission according to the provided TA, and may prepare the positioning measurement report to be transmitted in the provided uplink reporting resource (e.g. PUSCH). In a step 976, the WTRU may obtain (e.g., generate) a positioning measurement. The positioning measurement report may include any of the WTRU-specific ID (e.g. S-TMSI), the measurement ID, one or multiple measurement values, and a CRC. The report may be generated according to the UL grant, and may be transmitted, in a step 980, in the granted resources. After transmitting the measurement report, in a step 982, the WTRU may reset its positioning measurement report timer and may resume idle/inactive mode procedures (e.g., the WTRU may transition to the step 960. In case it is determined in the step 972, that a RAR has been received (e.g., within an appropriate time interval), the WTRU may transition to the step 966 for retransmitting the positioning measurement report.

FIG. 10 is a diagram illustrating an example of a signaling exchange for a two-message downlink positioning measurement reporting using PRACH and PUSCH 1000. In FIG. 10, a signal exchange may be carried out between the network and a WTRU in which the WTRU may provide a two-message idle/inactive mode positioning reporting using PRACH and PUSCH. With reference to FIG. 10, configuration information for configuring the WTRU to perform idle/inactive mode positioning reporting, may be received by the WTRU in an RRC connected mode 1012. The configuration information may include any of a WTRU ID (e.g. Positioning-TMSI), a periodicity (e.g., time intervals during which the WTRU may perform positioning measurement reporting), positioning specific PRACH preambles, report encryption keys, a measurement report ID, etc.). The WTRU may receive an RRC connection release 1014 and may go (e.g., transition) to idle/inactive mode 1018. The WTRU may transmit a first positioning message MSG1 1020, for example using a RACH preamble, requesting to transmit a positioning measurement report, according to the configured periodicity. The WTRU may receive a second positioning message MSG2 1022, for example in a RAR, including any of temporary identifier, an UL grant, a TA, etc. The WTRU may transmit a third positioning message MSG3 1024 in the PUSCH according to the UL grant, the third positioning message MSG3 1024 including any of a WTRU ID, and a positioning measurement report according to any embodiment described above. The BS may forward 1026 the positioning measurement report to a location server.

Reconfiguring, Terminating Measurement Reporting Examples

According to embodiments, measurement reports may be terminated and/or reconfigured in various ways. Measurement report termination and/or reconfiguration may be carried out while a WTRU is in RRC connected mode, for example. The WTRU in idle/inactive mode may monitor broadcast channels, such as common PDCCH or PBCH for an indication that the WTRU may initiate RRC connection (e.g. any of a CN- and RAN-paging). The WTRU may initiate an RRC connection request through a (e.g., traditional) RACH procedure (e.g. 2-step or 4-step RACH procedure). In case the WTRU is in RRC connected mode, a WTRU may be reconfigured to terminate or alter (e.g. modify) its idle/inactive mode positioning measurements through any of conventional RRC and location services protocol messaging.

Modified PRACH for Uplink-Based Positioning Examples

According to embodiments, uplink-based positioning may be triggered at a WTRU in case it observes (e.g., detects) any change (e.g., any of a RSRP, AoA, RTT, etc.) in the (e.g., received) downlink reference signals, (e.g., any of a PSS, a SSS, a DL-PRS, a DMRS in common PDCCH, etc.) received from one or more BSs (e.g., any of gNB, eNB, TRP) in its tracking area. Detecting a change in received downlink signals from different BSs may indicate a positioning change (e.g., a change of location) of the WTRU.

According to embodiments, the WTRU may be configured to transmit (e.g., periodic) uplink-based positioning related measurements at (e.g. specific) times, for example, while in idle/inactive mode. According to embodiments, the WTRU may be configured with (e.g., idle/inactive mode) positioning update parameters (e.g., any of a period, a start time, a stop time, etc.), for example, while the WTRU is in active (e.g. RRC connected) mode or may be provided as System Information (SI). According to embodiments, for the (e.g., idle/inactive mode) positioning updates, a WTRU in idle/inactive mode may perform transmissions of uplink reference signals, for example, of uplink positioning reference signals. Embodiments are described herein for a WTRU in idle/inactive mode, but they are not limited to a WTRU in idle/inactive mode and may be also be applicable to a WTRU, for example, in a connected mode.

Uplink Positioning Reference Signals Using PRACH and PUSCH Examples

Figure 11:
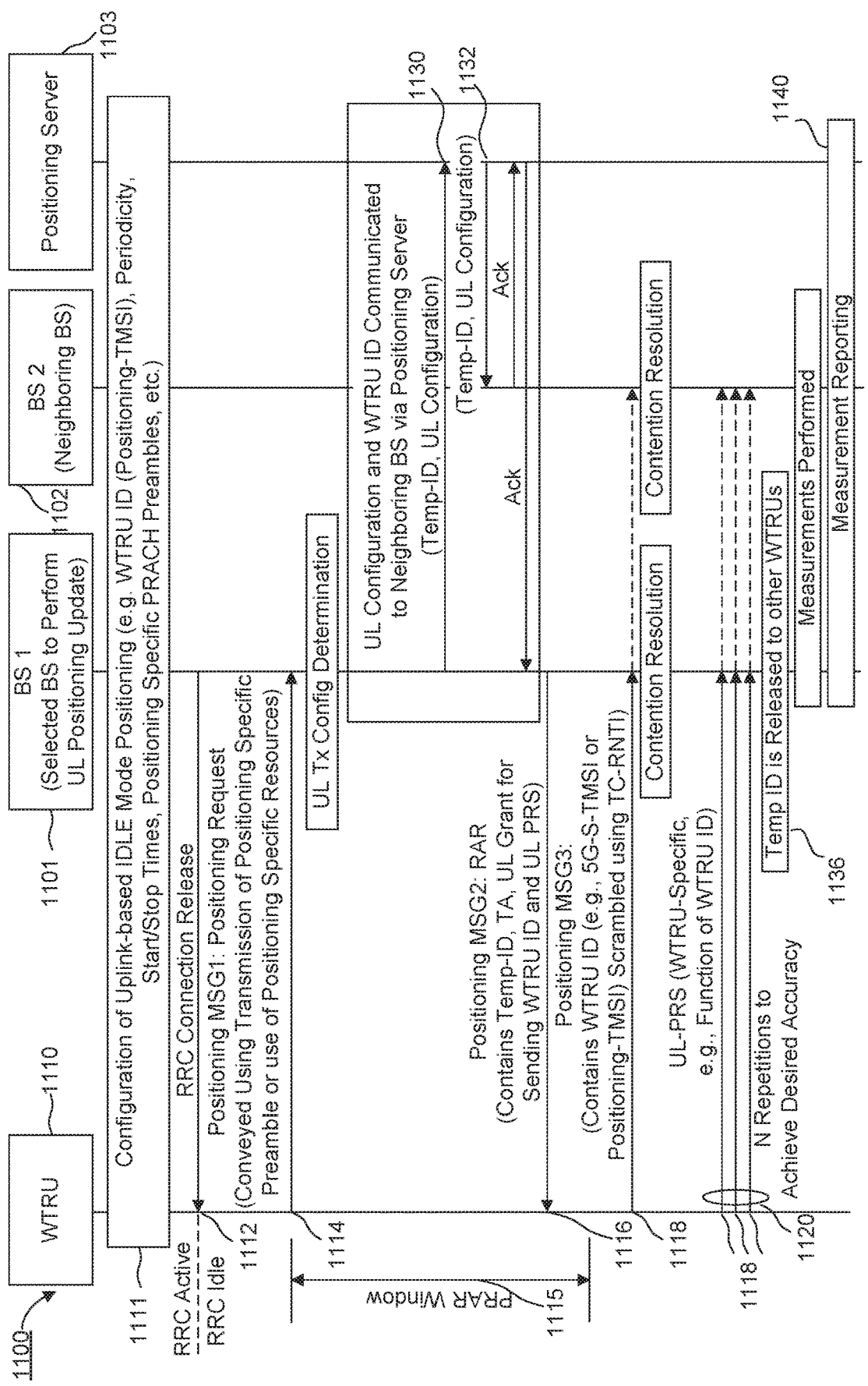
FIG. 11 is a diagram illustrating an example of an uplink-based positioning update procedure.

FIG. 11 is a diagram illustrating an example of an uplink-based positioning update procedure 1100. According to the procedure, the idle/inactive mode WTRU 1110 may be configured to perform positioning update using the PRACH and/or allocated resources on PUSCH 1111. According to embodiments, a WTRU 1110 may select a BS 1101 to perform an idle/inactive mode uplink-based positioning procedure (e.g., based on the downlink measurements on the downlink synchronization signals, such as, for example, any of PSS, SSS, DM-RS of common PDCCH, etc.). The BS 1101 which is selected by the WTRU 1110 to initiate the uplink-based positioning procedure may be referred to herein as the reference BS 1101.

According to embodiments, one or more preambles from a set of RACH preambles may be allocated to perform idle/inactive mode positioning. The preambles allocated for idle/inactive mode positioning, which may be referred to herein as positioning preambles, may be used by a WTRU 1110 to transmit a positioning request. The positioning preambles may not be assigned for contention-based and/or contention-free RACH procedures. In other words, the positioning preambles may be different from other preambles assigned to (e.g., any other) RACH procedures. According to embodiments, the preambles may be common to all or a set of WTRUs in a cell to perform idle/inactive mode positioning, (e.g., contention-based idle/inactive mode positioning). According to embodiments, a set of (e.g., positioning) resources may be (e.g., specifically) allocated for positioning request transmission. For example, a positioning request may be transmitted by a transmission (e.g., of a preamble assigned for idle/inactive mode positioning or for other purposes such as RACH procedure) in the (e.g., specifically) allocated positioning resources. According to embodiments, the time/frequency resources allocated for idle/inactive mode positioning may not be assigned for contention-based and/or contention-free RACH procedures. In other words, the time/frequency resources allocated for idle/inactive mode positioning request transmissions may be different from other time/frequency resources allocated to (e.g., any other) RACH procedures. According to embodiments, allocation (e.g., configuration) of preambles (and/or positioning resources) for idle/inactive mode positioning request transmission may be communicated to the WTRU 1110 (e.g., in system information). According to embodiments, the WTRU 1110 may receive (e.g., other) parameters, which may include, any of a preamble power, a positioning random access response (PRAR) window size, a power ramping factor, and a maximum number of retransmissions.

According to embodiments, a WTRU 1110 may initiate an uplink-based positioning procedure in idle/inactive mode, for example after receiving an RRC connection release 1112. According to embodiments, a WTRU 1110 may transmit a positioning MSG1 1114, which may be referred to herein as a positioning request, to the reference BS 1101. The positioning request 1114 may be conveyed (e.g., transmitted) using any of transmitting a positioning specific preamble and transmitting in a positioning specific resource. According to embodiments, the WTRU 1110 may (e.g., randomly) select one of the positioning specific preambles (e.g., allocated for idle/inactive mode positioning). According to embodiments, the WTRU 1110 may transmit the selected positioning specific preamble to the reference BS 1101 using a (e.g., time/frequency) resource or may transmit a (e.g., any) preamble (e.g., assigned for idle/inactive mode positioning or for other purposes such as RACH procedure) in positioning specific resources (e.g., specially) reserved for positioning request transmission. According to embodiments, the WTRU 1110 may use the PRACH configuration (e.g., time/frequency resources), which may be provided or configured by the reference BS 1101, to send (e.g., transmit) the selected preamble sequence, e.g., in system information. According to embodiments, the WTRU 1110 may be configured 1111 with any of a set of positioning specific preambles and a set of positioning specific resources for transmitting positioning requests.

According to embodiments, after sending a positioning request 1114 (e.g., any of a positioning preamble transmission and a transmission in a positioning resource), the WTRU 1110 may monitor for reception of a positioning MSG2 RAR 1116 (e.g., a PRAR), for example in a PRAR (e.g., time) window 1115. A positioning random access response 1116 may be referred to herein as any of a "positioning RAR" and a "PRAR". According to embodiments, monitoring for a PRAR may include monitoring for a radio network temporary identifier (RNTI). The RNTI may be similar/akin to a random access RNTI (RA-RNTI), e.g., specific to the time/frequency resources used to transmit idle/inactive mode positioning preamble. According to embodiments, monitoring for the RNTI may include monitoring for a control channel or a downlink control information (DCI) masked or scrambled (e.g., with a CRC scrambled) with the RNTI. According to embodiments, the control channel or a DCI may include the PRAR 1116 or may be associated with a data channel that may carry the PRAR. According to embodiments, a PRAR 1116 may include an information indicating for which transmitted preamble(s) the PRAR 1116 may correspond or may be intended. According to embodiments, a plurality of PRARs (e.g., for different transmitted preambles that may have been transmitted by different WTRUs) may be transmitted simultaneously (e.g., in the same control channel or data channel).

According to embodiments, a PRAR 1116 may include any of a timing advance (TA) value, a temporary WTRU identifier (e.g., temporary cell (T-CRNTI), a bandwidth part (BWP), a set of resources (e.g., time/frequency resources) to transmit the WTRU (e.g., unique) ID, the UL configuration (e.g., time/frequency resources) to transmit the uplink reference signals (e.g. any of the uplink positioning reference signals UL PRS, UL SRS, UL DM-RS). The UL configuration may include any of a bandwidth, time/frequency resources, and a number of repeated reference signal transmissions (e.g., a number of repetitions). In a variant, in addition, or instead of a temporary WTRU identifier, a new set of identifiers may be allocated by the reference BS for being included in a PRAR 1116. The new identifiers may be local to (e.g., managed, allocated by) any of an AMF, a MME and a positioning server, (e.g., temporary positioning RNTI (TP-RNTI). According to embodiments, the WTRU (e.g., unique) ID may be, for example, any of a S-TMSI, 5G-S-TMSI. According to embodiments, a (e.g., unique) identifier to perform idle/inactive mode positioning may be assigned to the WTRU, which may be referred herein as a Positioning-TMSI. The configuration of a Positioning-TMSI by the network may be carried out during the active (e.g., RRC connected) state. According to embodiments, a Positioning-TMSI may be unique for the WTRU within its tracking area. According to embodiments, when a tracking area is changed, a new Positioning-TMSI may be assigned to the WTRU as a part of the tracking area update procedure.

According to embodiments, if the WTRU does not receive any response (e.g., including a PRAR and scrambled with the RA-RNTI) indicating the preamble transmitted by the WTRU 1110 within the PRAR window 1115, the WTRU 1110 may send another preamble (e.g., at a later time). The response (e.g., received or expected to be received in the PRAR window 1115) may include an information indicating the preamble transmitted by the WTRU 1110 in the positioning request 1114. According to embodiments, the transmission at the later time may be at a higher power. The power may be limited to a maximum power. According to embodiments, the WTRU 11110 may wait for receipt of a PRAR 1116 from the reference BS (e.g., up to the end of the PRAR window 1115). According to embodiments, the sequence of transmitting and waiting may continue until the reference BS 11101 may respond with an PRAR 1116 or until a maximum number of preamble transmissions may have been reached. According to embodiments, the reference BS may transmit and the WTRU 1110 may receive the PRAR 1116 in response to a single preamble transmission or a plurality of preamble transmissions.

According to embodiments, if a WTRU 1110 receives a PRAR 1116 that may be intended for it (e.g., indicating a positioning preamble transmitted by the WTRU 1110 in the positioning request 1114), the WTRU 1110 may transmit a positioning MSG3 1118 including its (e.g., unique) WTRU ID and a repetition 1120 of UL PRS transmissions 1118 on the indicated resources. According to embodiments, the WTRU 1110 may use the temporary identifier received in the PRAR 1116 (e.g., any of a T-CRNTI, a TP-RNTI) to scramble its uplink transmission that may include a (e.g., unique) WTRU ID. According to embodiments, the WTRU 1110 may use its (e.g., unique) WTRU ID to obtain (e.g., generate) WTRU-specific UL PRS. For example, an UL PRS may be obtained using a pseudo-random (PN) sequence, where the PN sequence generator may be initialized using the WTRU ID, for example, as one of the parameters. In another example an UL PRS may be obtained by selecting a numerical sequence that, for example, possesses good autocorrelation and cross-correlation properties (such as for example and without limitation a Zaddoff-Chu sequence) and by performing a binary operation, e.g., XOR, between the selected numerical sequence and the WTRU ID.

According to embodiments, the WTRU 1110 may apply the indicated TA to its transmission (e.g., in the UL). According to embodiments, the WTRU 1110 may repeat (e.g., a same) UL PRS transmission 1118 N times (e.g., transmit a repetition of N UL PRS, N being an integer number greater than 1) as, for example, configured by the reference BS 1101 in the granted resources. The number of repetitions may be selected for achieving a (e.g., desired) level of positioning accuracy.

According to embodiments, the uplink transmission of the (e.g., unique) WTRU ID and the UL PRS may be received by the reference BS 1101 and one or more neighboring BSs 1102. According to embodiments, any number of neighboring BSs 1102 may be configured to receive uplink transmission of WTRU ID and UL PRS, e.g., by the positioning server 1103. For example, the reference BS 1101, after receiving a positioning preamble from a WTRU 1110, may send 1130 the assigned temporary identifier (e.g., T-CRNTI or TP-RNTI) and the UL configuration (related to WTRU ID and UL PRS) to the positioning server 1103, which, the positioning server 1103 may further send 1132 to the neighboring BSs 1102.

According to embodiments, the reference BS 1101 and any number of configured neighboring BSs 1102, where the uplink measurements may be performed, may extract the (e.g., unique) WTRU ID using the temporary WTRU identifier (e.g., any of a T-CRNTI, a TP-RNTI). According to embodiments, the reference BS 1101 and any number of configured neighboring BSs 1102 may use the (e.g., unique) WTRU ID to decode the WTRU-specific positioning reference signals. According to embodiments, the reference BS 1101 and any number of configured neighboring BSs 1102 may make measurements (e.g., any of a RSRP and a TOA) based on the decoded WTRU-specific positioning reference signals. According to embodiments, the configuration of measurements may be done (e.g., determined, transmitted) by the positioning server 1103. According to embodiments, the reference BS 1101 and any number of configured neighboring BSs 1102 may report 1140 the measurements along with the (e.g., unique) WTRU ID to the positioning server 1103.

According to embodiments, the uplink transmission of reference signals (e.g., any of SRS, UL PRS etc.) may be configured (e.g., with a periodicity) to occur periodically with (e.g., specified, periodic) start and stop times. According to embodiments, such (e.g., each) periodic occasion may include a plurality of transmissions of the reference signals (e.g., any of SRS, UL PRS, etc.) to achieve a (e.g., desired) measurement accuracy. According to embodiments, at the end of (e.g., each) transmission burst containing a plurality of reference signals that constitutes a single measurement, the reference BS 1101 may release 1136 the temporary identifier (e.g., any of a T-CRNTI, a TP-RNTI, etc.) that was assigned to the WTRU 1110 to the pool of available temporary identifiers. According to embodiments, at the start of the (e.g., next periodic) uplink positioning reference signal burst transmission the WTRU 1110 may transmit the positioning preamble and may acquire a new temporary identifier.

According to embodiments, the reference BS, optionally, may send an acknowledgement to the WTRU, for which the measurements were recorded. The acknowledgement may be scrambled using the (e.g., unique) WTRU ID.

According to embodiments, at the neighboring BSs, which may be configured by the positioning server to perform uplink measurements, the uplink measurements may be performed by the location measurements units (LMUs) integrated into the BSs. According to embodiments, the positioning server may use the (e.g., unique) WTRU ID to store and/or update the positioning information of a WTRU.

Figure 12:
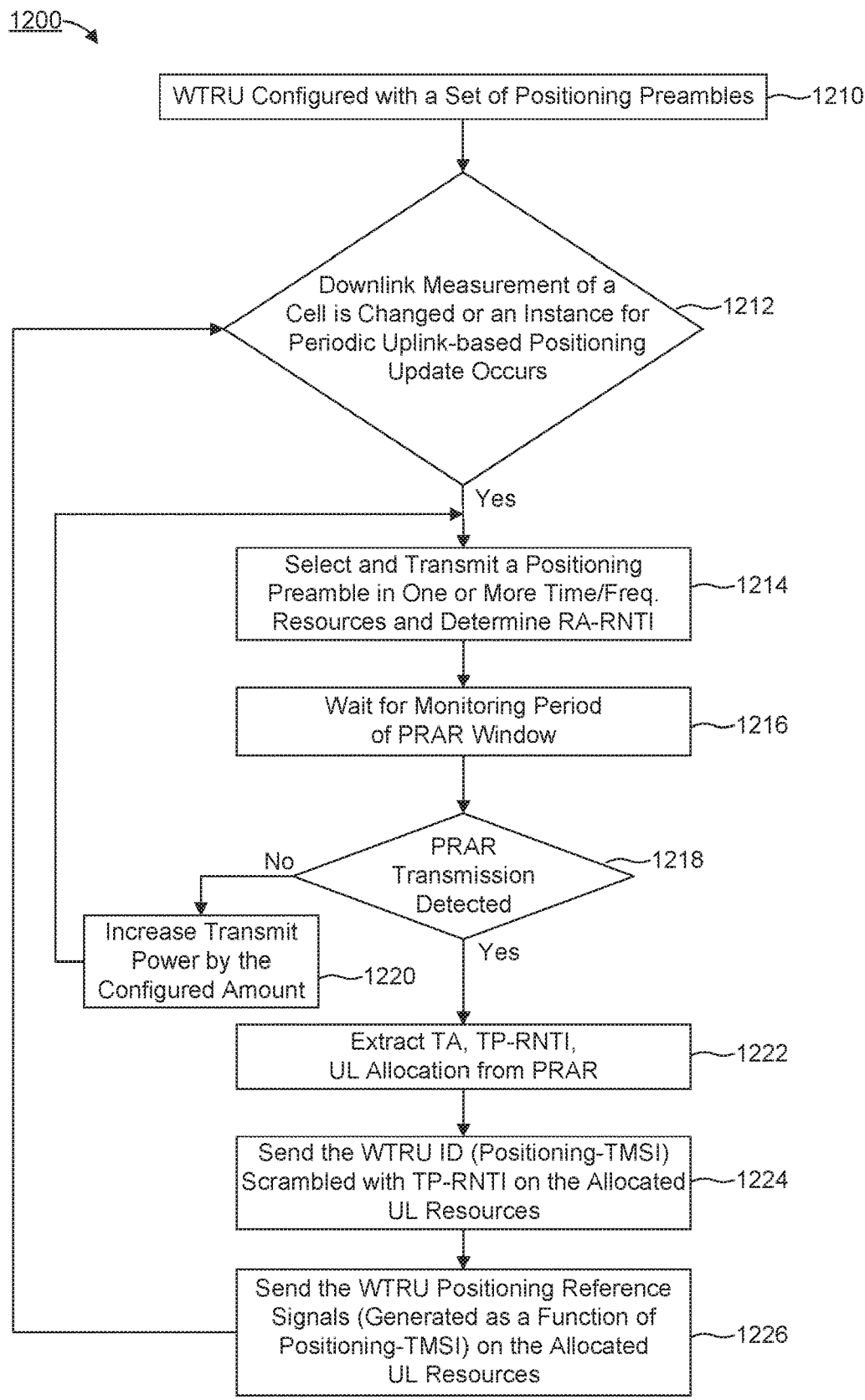
FIG. 12 is a diagram illustrating an example of uplink-based idle/inactive mode positioning using a common positioning specific preamble.

An example of WTRU procedure 1200 to perform uplink-based idle/inactive mode positioning is shown in FIG. 12. In a step 1210, a WTRU may be configured with a set of positioning preambles. The configuration of the WTRU may be performed by transmitting a configuration information (e.g., any of a set of positioning specific preambles and a set of positioning specific resources). According to embodiments, (not illustrated in FIG. 12) the WTRU may not receive any positioning configuration information (e.g., indicating any of a set of positioning specific preambles and a set of positioning specific resources). For example, the WTRU may use reserved (e.g., pre-allocated, pre-configured, default, etc.) positioning specific preambles and/or resources. In a step 1212, a change (e.g., variation) of a downlink measurement of the cell may be detected, indicating a change of position of the WTRU. In the step 1212 a periodic uplink-based positioning update may occur. If any of a change of position is detected and a periodic uplink-based positioning update occurs, the WTRU may (e.g., select and) transmit a positioning preamble in one or more time/frequency resources in a step 1214. The WTRU may determine a RA-RNTI. In a step 1216, the WTRU may wait for a monitoring period of (e.g., at least) a PRAR window. In the step 1218, the WTRU may detect a PRAR transmission. If no PRAR transmission is detected in the step 1218 after the monitoring period, the WTRU may increase the transmit power by a (e.g., configurable) amount in a step 1220 and transition to the step 1214. If a PRAR transmission is detected in the step 1218 (e.g., within the PRAR window), the WTRU may extract any of a TA, TP-RNTI and an UL allocation from the PRAR in a step 1222. In a step 1224, the WTRU may send (e.g., transmit) the WTRU ID (e.g., Positioning-TMSI) scrambled with the TP-RNTI on the allocated UL resources. In a step 1226, the WTRU may send (e.g., transmit) a repetition of a WTRU positioning reference signal (e.g., generated as a function of the WTRU ID) on the allocated resources.

According to embodiments, more than one (several different) WTRUs may use the same preamble on the same PRACH resource for an uplink-based positioning update. More than one WTRU may receive a same PRAR message from the reference BS. More than one WTRU may use the same resources to send their WTRU ID and UL PRS. The reference BS and/or any number of neighboring BSs may (e.g., successfully) decode more than one WTRU ID (using any of the assigned T-CRNTI, TP-RNTI) on the configured resource. According to embodiments, any (e.g., each) BS may decode more than one WTRU ID, may select (e.g., any of randomly, first decoded) one WTRU ID to perform further measurements. According to embodiment, any (e.g., each) BS may use the selected WTRU ID to decode the (e.g., WTRU-specific) positioning reference signals on the configured resources and may make measurements on them.

Figure 13A:
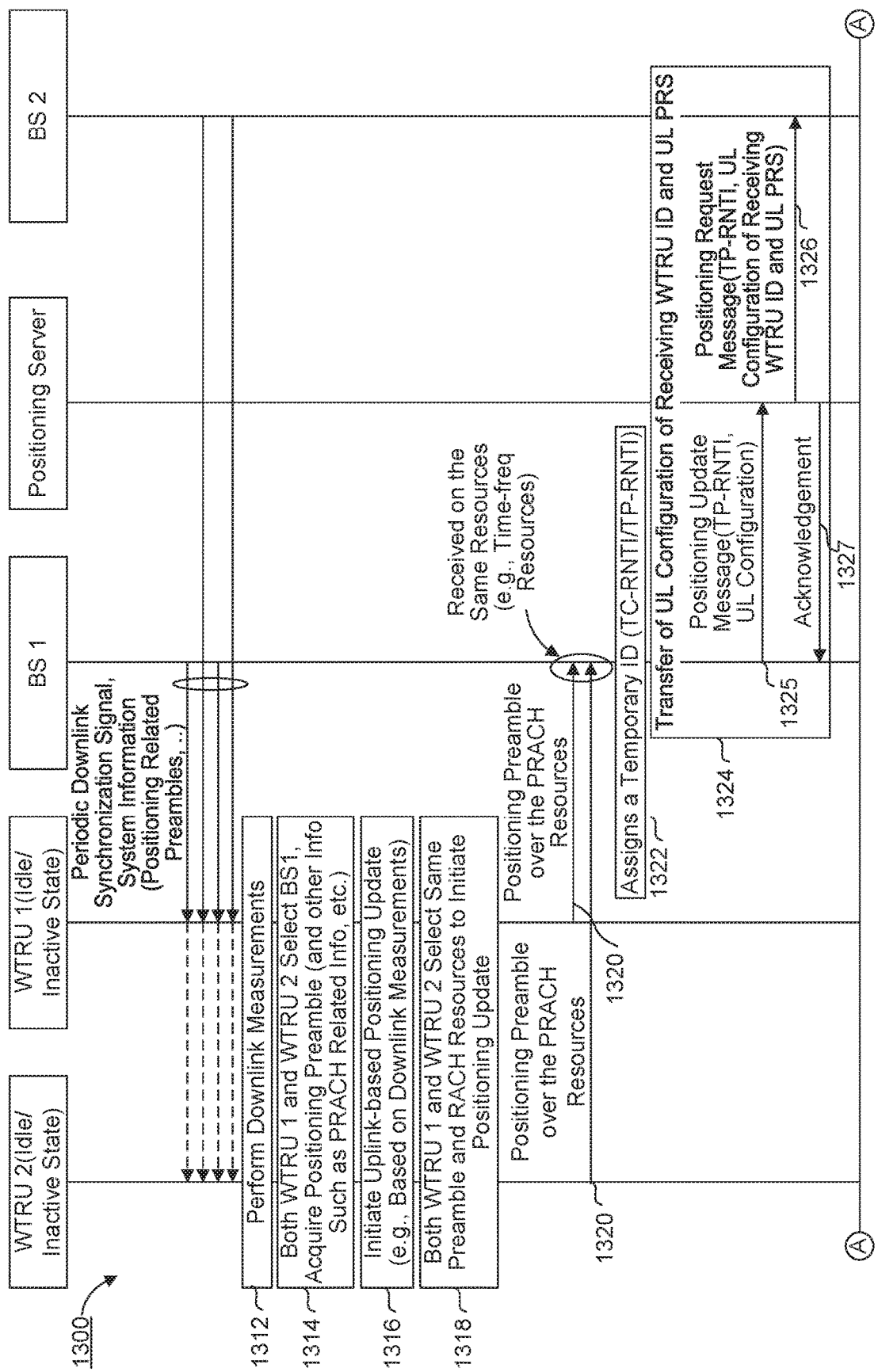
FIG. 13A is a diagram illustrating an example of a first part of a signaling exchange for uplink-based idle/inactive mode positioning using common positioning specific preamble with contention resolution.
Figure 13B:
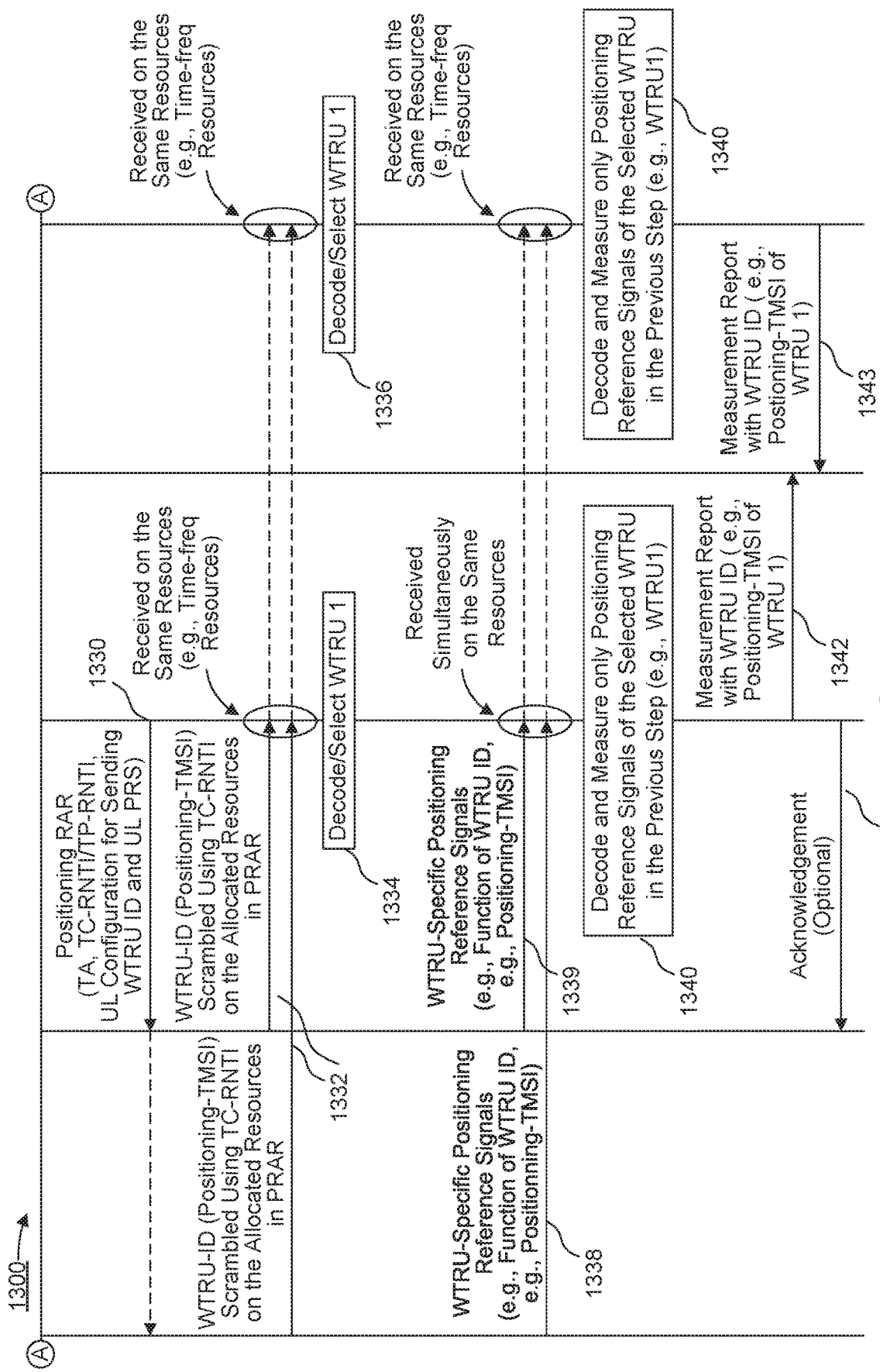
FIG. 13B is a diagram illustrating an example of a second part of the signaling exchange of FIG. 13A.

An example of contention resolution in uplink-based idle/inactive mode positioning 1300 is shown in FIG. 13A and FIG. 13B (collectively "FIG. 13"). With reference to FIG. 13, two WTRUs, namely, WTRU1, WTRU2 may select the same base station, BS1, and may transmit the same positioning preamble using the same PRACH resources to the BS1. Both the reference BS and the neighboring BS(s) may select WTRU1 to perform measurements and may report this measurement to the positioning server.

As shown on FIG. 13A, WTRU1 and WTRU2 may receive any of a periodic downlink synchronization signal, a system information (e.g., positioning specific preambles) from any of BS1 and BS2. WTRU1 and WTRU2 may perform downlink measurements 1312. As shown on FIG. 13, both WTRU1 and WTRU2 may select the same base station BS1, and may acquire (e.g., receive) positioning preambles (and e.g., additional (e.g., PRACH related) information etc.) 1314. Both WTRU1 and WTRU2 may initiate an uplink-based positioning update 1316 (e.g., based on downlink measurements). Both WTRU1 and WTRU2 may select the same preamble and the same RACH resources to initiate a positioning update 1318. Both WTRU1 and WTRU2 may transmit a same (e.g., positioning) preamble 1320 over the same PRACH resources. The base station BS1 may assign 1322 a temporary identifier (any of a T-CRNTI, and a TP-RNTI) and transfer (e.g., transmit) 1324 the uplink configuration of the receiving WTRU ID and the UL PRS. The base station BS1 may transmit a positioning update message 1325 to the positioning server. The positioning update message 1325 may include a temporary identifier (e.g., TP RNTI) and the uplink configuration. The positioning server may transmit a positioning request message 1326 to the base station BS2. The positioning request message 1326 may include a temporary identifier (e.g., TP RNTI) and the uplink configuration of receiving WTRU ID and UL PRS. The positioning server may transmit an acknowledgment message 1327 to acknowledge the positioning update message 1325.

As shown on FIG. 13B, the base station BS1 may transmit a positioning RAR 1330 including any of a TA, a T-CRNTI/TP-RNTI and an UL configuration for sending a WTRU ID and UL PRS. The PRAR 1330 may be received by both WTRU1 and WTRU2. Both WTRU1 and WTRU2 may transmit their WTRU ID, e.g., scrambled using a T-CRNTI on the resources allocated in the PRAR (e.g., using the same time/frequency resources) 1332. The base station BS1 may receive both WTRU IDs in the same time/frequency resources. The base station BS1 may decode 1334 (e.g., select) one of them (e.g., WTRU1). The base station BS2 may receive both WTRU IDs in the same resources. The base station BS2 may decode 1336 (e.g., select) one of them (e.g., WTRU1). Both WTRU1 and WTRU2 may transmit WTRU-specific positioning reference signals (UL PRS) 1338, 1339 in the same time/frequency resources. The UL PRS 1338, 1339 respectively transmitted by both WTRU1 and WTRU2 may be different (e.g., each generated as a function of the WTRU ID (e.g., Positioning-TMSI), and received by both base stations BS1 and BS2 in the same time/frequency resources. Both base stations BS1, BS2 may decode and measure (e.g., only) UL PRSs of the selected WTRU (e.g., WTRU1) 1340. Both base stations BS1, BS2 may transmit a measurement report message 1342, 1343 including the WTRU ID of WTRU1 to the positioning server. The base stations BS1, BS2 may (optionally) transmit an acknowledgment message 1344 to WTRU1.

Uplink Positioning Reference Signals Using PRACH and PUSCH—Beam-Based System Examples According to embodiments, for beam-based transmissions, a WTRU may be allocated (e.g., a list of) neighboring BSs (e.g., cell-identities) for which uplink measurements may be performed. According to embodiments, the uplink configuration (e.g., any of time/frequency resources, bandwidth, number of transmissions for the UL PRS) with respect to any (e.g., each) neighboring BS may be provided to the WTRU. According to embodiments, the list of neighboring BSs with the uplink configuration may be sent to the (e.g., requesting) WTRU by the reference BS (for example, that may have received and detected the positioning specific preamble from the requesting WTRU) in the PRAR message.

According to embodiments, the reference BS may acquire the uplink configuration of the neighboring BS from the positioning server. According to embodiments, the reference BS may send the angle of arrival (e.g., Rx beam identification) or angle of departure (e.g., Tx beam identification or SSB identification) information to the positioning server. According to embodiments, the angle of arrival/departure (e.g., beam identification or SSB identification) at the reference BS may be derived from the received positioning preamble of the requesting WTRU. According to embodiments, the angle of arrival/departure information from the reference BS may be used by the positioning server to assign a list of the neighboring BSs and their uplink configuration (e.g., any of time/frequency resources, bandwidth) to perform uplink positioning measurements for the requesting WTRU. According to embodiments, the positioning server may ask the neighboring BSs to send their scheduling configuration(s). According to embodiments, the angle of arrival/departure information from the reference BS may be used to derive the angle of arrival (e.g., Rx beam identification) at the neighboring BSs to receive the requesting WTRU's transmission. According to embodiments, the WTRU may report a selected (e.g., the best) beam (e.g., synchronization signal block (SSB) ID) for one or more neighboring BSs (e.g., participating in the uplink positioning measurements) to the reference BS. According to embodiments, the WTRU may receive a message or command from the reference BS to report the (e.g., selected, best) beam of one or more neighboring BSs. According to embodiments, the WTRU may select the (e.g., best) beam for different BSs based on its previous downlink measurements (e.g., measurements on the downlink synchronization signals, such as, for example, RSRP of SSBs). The reference BS may send the information of the selected (e.g., best) beam to the positioning server, which may forward it to the corresponding neighboring BSs. According to embodiments, the positioning server may request the neighboring BSs to perform uplink measurements and reports the results.

According to embodiments, the WTRU may receive the list of neighboring BSs with the uplink configuration by the reference BS in the PRAR message. According to embodiments, the requesting WTRU may use the uplink configuration received in the PRAR to send (e.g., transmit) its UL PRS. According to embodiments, the WTRU may select a set of neighboring BSs from the list of BSs provided (e.g., received) in the PRAR to send (e.g., transmit) the UL PRS. According to embodiments, the WTRU may use the best beam for any (e.g. each) BS to send (e.g., transmit) its UL PRS on the configured resources received in the PRAR.

One-Message WTRU-Specific Reference Signals Using PRACH Examples

According to embodiments, a WTRU may use (e.g., transmit) a (e.g., specific) preamble to perform uplink-based idle/inactive mode positioning. According to embodiments, the (e.g., specific) preamble may be WTRU specific, which may be allocated to the WTRU from the network (e.g., during RRC connected state of the WTRU) to transmit uplink-based idle/inactive mode positioning signals. According to embodiments, the WTRU-specific preamble may be associated with the WTRU ID, which may be unique within the tracking area (e.g., any of a S-TMSI, a 5G-S-TMSI, a Positioning-TMSI).

According to embodiments, a WTRU may use one or more PRACH resources (e.g., time/frequency) of a BS to transmit the WTRU-specific preamble. According to embodiments, the RACH resources may be communicated to (e.g., received by) the WTRU, e.g., in system information.

According to embodiments, the WTRU may be assigned one or more specific time/frequency resources for sending (e.g., transmitting) a preamble to update its positioning information in the idle/inactive mode. According to embodiments, the network may (e.g., uniquely) assign (e.g., specific) time/frequency resources to one or more WTRUs, for example, within a (e.g., tracking) area. According to embodiments, the information of a specific time/frequency resources may be communicated to the WTRU, for example, during a tracking area update procedure.

According to embodiments, if the WTRU is configured to use a (e.g., specific) preamble, the configuration of WTRU-specific preambles may be communicated (e.g. transmitted) to a plurality of BSs (e.g., in the WTRU's tracking area) by the positioning server. According to embodiments, if the WTRU is configured to use a specific time/frequency resource to send (e.g., transmit) a preamble to update its positioning information in the idle/inactive mode, the configuration of (e.g., specific) time/frequency resources may be communicated to the plurality of BSs (e.g., in the WTRU's tracking area) by the positioning server.

According to embodiments, the WTRU may initiate the uplink-based positioning update, e.g., by transmitting a WTRU-specific preamble using one or more common PRACH resources and/or specific time/frequency resources, if configured. According to embodiments, the WTRU may initiate the uplink-based positioning update, e.g., by transmitting a common PRACH or positioning specific preamble using one or more (e.g., specific) time/frequency resources.

According to embodiments, following WTRU transmission of one or more positioning preambles (e.g., any of WTRU-specific and common), the BSs, which may detect the preamble, and which may be configured by the positioning server to perform uplink measurements, may make measurement and report to the positioning server.

One-Message WTRU-Specific Reference Signals Using PRACH Beam-Based System Examples According to embodiments, for beam-based transmissions, a WTRU may use the best beam for any (e.g., each) BS to send (e.g., transmit) its WTRU-specific positioning preambles on the RACH occasions specific to each BS. According to embodiments, the selection of BSs and the corresponding best beam to send WTRU-specific positioning preambles may be carried out by the WTRU based on the downlink measurements (e.g., measurements on the downlink synchronization signals, such as, for example, a RSRP of SSBs). According to embodiments, the time/frequency resources for any (e.g., each) selected BS may be communicated to (e.g., received by) the WTRU, e.g., in system information. According to embodiments, the selection of BSs to send (e.g., transmit) WTRU-specific positioning preambles may be communicated to (e.g., received by) the WTRU, for example, during tracking area update procedure.

According to embodiments, the WTRU may be assigned one or more specific time/frequency resources on any (e.g., each) BS for sending (e.g., transmitting) a preamble to update its positioning information in the idle/inactive mode. According to embodiments, the network may (e.g., uniquely) assign (e.g., specific) time/frequency resources to one or more WTRUs on any (e.g., each) BS, for example, within a tracking area. According to embodiments, the information of a specific time/frequency resources may be communicated to the WTRU, for example, during a tracking area update procedure. According to embodiments, for any (e.g., each) BS, the WTRU may use the specific time/frequency resources and the best identified beam to send (e.g., transmit) its one or more preambles.

New Physical Channel for Positioning Examples

According to embodiments, a WTRU may transmit any of DL positioning measurement reports and/or RS for UL positioning measurements over a (e.g., dedicated) physical channel to perform positioning while in RRC idle/inactive mode. According to embodiments, positioning may be performed based on any of uplink and downlink signals.

According to embodiments, for downlink-based positioning a WTRU in idle/inactive mode may perform positioning measurements (e.g., any of RSTD, OTDOA, etc.) on (e.g., regularly timed) broadcast channels, such as any of SSB transmissions in NR and reference signals (e.g., PRS). According to embodiments, the WTRU in idle/inactive mode may report those measurements to the positioning server (e.g., E-SMLC) through, for example, the reference BS using, for example, a new positioning physical random-access channel (P-PRACH).

According to embodiments, for uplink-based positioning the WTRU may transmit positioning signals (e.g. any of a RS, a RACH preamble, synchronization signals, etc.) on the P-PRACH that may be monitored by (e.g., local) BSs and the positioning measurements (e.g., UTDOA) may be forwarded to the positioning server (e.g., E-SMLC) to, for example, determine the WTRU's position.

Downlink-Based Positioning Examples

According to embodiments, a WTRU may transmit a positioning preamble in an (e.g., assigned) time and frequency resource (e.g., one or more resource elements). While doing so, the WTRU may use an assigned positioning preamble. According to embodiments, the positioning preamble may be obtained (e.g., built, computed) using a numerical sequence that, for example, possesses good auto-correlation and cross-correlation properties (such as for example and without limitation a Zaddoff-Chu sequence). According to embodiments, the positioning preamble may be different from the RACH preamble used for any of an initial access, a cell re-selection, etc., and may use different time/frequency resources.

According to embodiments, the WTRU may use a (e.g., unique, same) positioning preamble within a transmission opportunity, comprising a set of contiguous time/frequency resources (e.g., positioning random access channel occasion (PRO)), for example to be (e.g., individually) identifiable even when there are a plurality of simultaneous transmissions (e.g., in case several different transmissions occur during a same period of time). According to embodiments, the (e.g., unique) positioning preamble may be assigned to the WTRU by the serving BS in a case where the WTRU is in connected state and may be unique within the cell. According to embodiments, the positioning preamble may be associated with a preamble ID. According to embodiments, the complete set of available positioning preambles may be partitioned into a plurality of groups (e.g., pools) to convey certain information to the reference BS. According to embodiments, different time/frequency resources may be assigned for the WTRU to signal (e.g., indicate) a range of conditions to the reference BS.

According to embodiments, the WTRU, after transmitting the positioning preamble, may monitor the PDCCH for DCI scrambled using its own preamble ID. According to embodiments, the DCI in the PDCCH may include the resource allocation for WTRU to transmit the positioning information in the shared channel (e.g., PUSCH). According to embodiments, the content of the DCI may include and/or indicate the temporary WTRU identifier (e.g., C-RNTI). According to embodiments, the content of the DCI may include and/or indicate the assigned modulation and coding scheme (MCS) for the WTRU to use for the uplink transmission. According to embodiments, the WTRU may append a (e.g., unique) identifier with the positioning information (e.g. S-TMSI). According to embodiments, the WTRU may append a (e.g., unique) identifier for the positioning information configuration. This message may be sent unencrypted or using an encryption key (e.g. any of configured in RRC connected mode, previously agreed upon, etc.).

According to embodiments, in case the WTRU does not receive a DCI scrambled with its own preamble ID within a (e.g., certain) duration (e.g., based on a timer started after the positioning preamble is transmitted), then the WTRU may abandon the current transmission process and may wait for the next assigned positioning random access channel occasion (PRO).

According to embodiments, the WTRU may monitor a physical channel for an indication and/or to determine that the measurement reporting has been terminated by the network. According to embodiments, the indication may be transmitted over a dedicated physical channel to the WTRU, e.g., while it is in RRC idle/inactive mode. According to embodiments, the WTRU may receive an indication from the network to initiate an RRC connection (e.g., paging, etc.) to terminate and/or re-configure the idle/inactive mode measurement reporting.

Uplink Synchronized Transmission Examples

According to embodiments, a WTRU in idle/inactive mode, and (e.g., periodically) monitoring downlink broadcast channels (e.g., SSB transmissions), may determine the status of its own uplink synchronization, for example, to apply the timing advance to positioning preamble transmission. According to embodiments, UL synchronization may be configured over another channel (e.g. PRACH, etc.) and/or on the same channel as at a previous occasion.

According to embodiments, the WTRU may be configured by the network with a first (e.g., threshold) value for positioning measurements. According to embodiments, if the downlink positioning measurements (e.g., OTDOA, RSTD, etc.) of an idle/inactive mode WTRU differ from the previous measurements by an amount that is less (e.g., smaller) than the (e.g., threshold) value, the WTRU may determine that it is uplink synchronized. According to embodiments, if the WTRU is configured to perform a plurality of downlink-based positioning measurements associated with different BSs, the WTRU may determine that it is uplink synchronized with the serving cell (e.g., only) if all positioning measurements differ from their previous values by values that are less (e.g., smaller) than a (e.g., threshold) value.

According to embodiments, the WTRU may be configured with a plurality of (e.g., threshold) values for a plurality of positioning measurements. According to embodiments, the WTRU may be configured with two (e.g., threshold) values—one, for example, for the reference cell and another, for example, for neighboring cells.

According to embodiments, the WTRU may be configured to perform measurements on a plurality of downlink transmissions (e.g., any of SSB, PRS, etc.) to obtain (e.g. achieve a desired) measurement accuracy. According to embodiments, the number and/or locations of the signals for measurements may be configured in the WTRU while in connected mode. According to embodiments, the WTRU may be configured to compute the average of a plurality of measurements from the same BS for reporting and comparison against a configured (e.g., threshold) value.

According to embodiments, the WTRU may be configured with a second (e.g., threshold) value. According to embodiments, if the difference between the WTRU's current positioning measurement value (e.g., any of OTDOA, RSTD, etc.) and the previous measurement value exceeds the first (e.g., threshold) value but is smaller than the second (e.g., threshold) value, the WTRU may determine (e.g., estimate) that its timing advance (TA) has changed by a first value (e.g., TA(current)=TA(previous)+1, TA(current)=TA (previous)−1). According to embodiments the WTRU may apply the new TA value to the uplink positioning preamble transmission.

According to embodiments, the WTRU may determine that it is no longer uplink synchronized with the serving cell, for example when (e.g., in case) the WTRU's current positioning measurement differs from the previous measurement by a value that exceeds the (e.g., largest threshold) value. Then the WTRU may not utilize the (e.g., regular) PRO for positioning preamble transmission.

According to embodiments, the WTRU transmissions in the regular PRO may be uplink synchronized, and a small guard time (GT) may be configured by the network (e.g., GT=1*TA). The positioning preamble transmission by the WTRU may have some timing misalignment due to some variations in the estimation by the WTRU of the relative position and small changes in WTRU's relative position and TA. According to embodiments, configuring a PRO with a (e.g., small) GT may allow to avoid violating slot boundaries due to these variations in estimation and small relative position and TA changes. According to embodiments, the GT may remain small (e.g., one or a few TA) and at least may be much smaller than a regular GT designed for a large sized cell (e.g., in LTE GT=1032*TA).

Reuse of WTRU-Specific Positioning Preambles Examples

Assigning a different positioning preamble to each WTRU may imply large computational resources in the BS for performing cross-correlation for all possible preamble configurations. Configuring the positioning preambles such that they are unique across a positioning area (e.g. tracking area), may allow to reduce the computational resources in the BS. A positioning area may refer to an area where the WTRU in idle/inactive mode may use the same positioning preamble. Configuring WTRUs with positioning preambles that are unique within a cell, may allow a reduction in search space for the BS within a positioning area, and in turn, to further reduce the computational resources in the BS for identifying the WTRU transmitting a positioning preamble.

For WTRUs that may be configured to report periodic measurements in the idle/inactive mode, a further reduction in the preamble ID space may be possible by reusing preambles in different PROs. According to embodiments, depending on the configured positioning measurement reporting periodicity, (e.g., only) the WTRUs that may transmit during a same PRO may be assigned unique positioning preambles (the position preambles may be unique only in a given PRO). According to embodiments, the positioning preambles may be reused (e.g., recycled) for a next group of WTRUs that may use the following PRO to initiate positioning measurement transmission procedure (e.g., transmit position measurement reports).

According to embodiments, a WTRU may be configured for positioning measurements by the positioning server located within the network. According to embodiments, the configuration may include any of a measurement type, a measurement periodicity, a measurement start time (e.g., in terms of frames, subframes, etc.), a reporting periodicity, a reporting start time and unique cell-specific positioning preamble id. According to embodiments, the WTRU may use the configured parameters to perform idle/inactive mode positioning measurements and reporting of measured quantities.

According to embodiments, a (e.g., preferred) BS may determine the (e.g., unique) WTRU ID of the WTRU that transmitted the positioning preamble within a PRO based on its determination of the PRO identifier (e.g., SFN where PRO is located) and/or the WTRU positioning preamble ID. According to embodiments, the (e.g., preferred) BS may transmit a DCI in the PDCCH scrambled using a combination of the cell ID and/or any of the WTRU ID and the positioning preamble ID used by the WTRU. According to embodiments, the DCI may include and/or indicate a resource allocation for positioning report transmission.

Hierarchical Partitioning of Positioning Preambles Examples

According to embodiments, a complete set of (e.g., available) positioning preambles may be split into a plurality of (e.g., different) groups (e.g., pools) for use by idle/inactive mode WTRUs for sending positioning reports under different conditions. This may enable an idle/inactive mode WTRU to implicitly signal to the (e.g., preferred) BS different conditions, by choosing a preamble from different (e.g., appropriate) groups.

According to embodiments, one group of positioning preambles may be assigned to the BSs (cell-specific positioning preambles). The WTRUs may be assigned positioning preamble IDs before entering idle/inactive mode by their serving BS. For an idle/inactive mode WTRU, the (e.g., preferred) BS may maintain a mapping between the positioning preamble ID and/or the WTRU ID. According to embodiments, in case of periodic positioning reporting, the cell-specific positioning preambles may be reused by the BS across successive PROs to reduce the search space for the BS. In this case, the BS may maintain a mapping between the WTRU ID, the positioning preamble ID and the PRO identifier (e.g., SFN in which the PRO is located).

According to embodiments, a (e.g. second) group of positioning preambles may be assigned for use by all BSs within a positioning area (PA-common positioning preambles). The positioning area may include a group of BSs in an area. For example, the positioning area may be the same as the tracking area. According to embodiments, an idle/inactive mode WTRU may use a positioning preamble for this group in case any of the following first and second conditions is satisfied. A first condition may include a positioning measurement differing from the previous measurement by a value larger than a (e.g., given, maximum) value. The (e.g., given, maximum) value may be configurable, and may have been configured previously by the network before the WTRU entered in idle/inactive mode. A second condition may include determining by an idle/inactive mode WTRU, that its (e.g., preferred) BS may be updated, based, for example, on positioning measurements. An idle/inactive mode WTRU may determine to update its (e.g., preferred) BS, for example, when the WTRU determines based on any of its positioning measurements, RSRP/RSRQ measurements on SSB transmissions from a plurality of BSs, or otherwise, that it is now physically located closer to a different BS than its current (e.g., preferred) BS.

According to embodiments, the PA-common positioning preamble may not be WTRU-specific. For example, a small group of such PA-common positioning preambles may be assigned for use by (e.g., all) WTRUs within a positioning area. If a WTRU uses a positioning preamble from this group, it may not be individually identifiable at the reference BS based only on the positioning preamble. The WTRU may send its WTRU ID (e.g., S-TMSI, etc.) in a position report, for example, in a positioning message, such as Positioning-Msg 3 set forth in FIG. 10 or FIG. 11, to resolve the ambiguity.

According to embodiments, an idle/inactive mode WTRU may be configured to use a positioning preamble for the PA-common positioning preamble group, for example chosen (e.g., randomly, any) from the (e.g., available) preamble IDs. According to embodiments, an idle/inactive mode WTRU may have been assigned a positioning preamble ID by the network before entering the idle/inactive mode.

Figure 14:
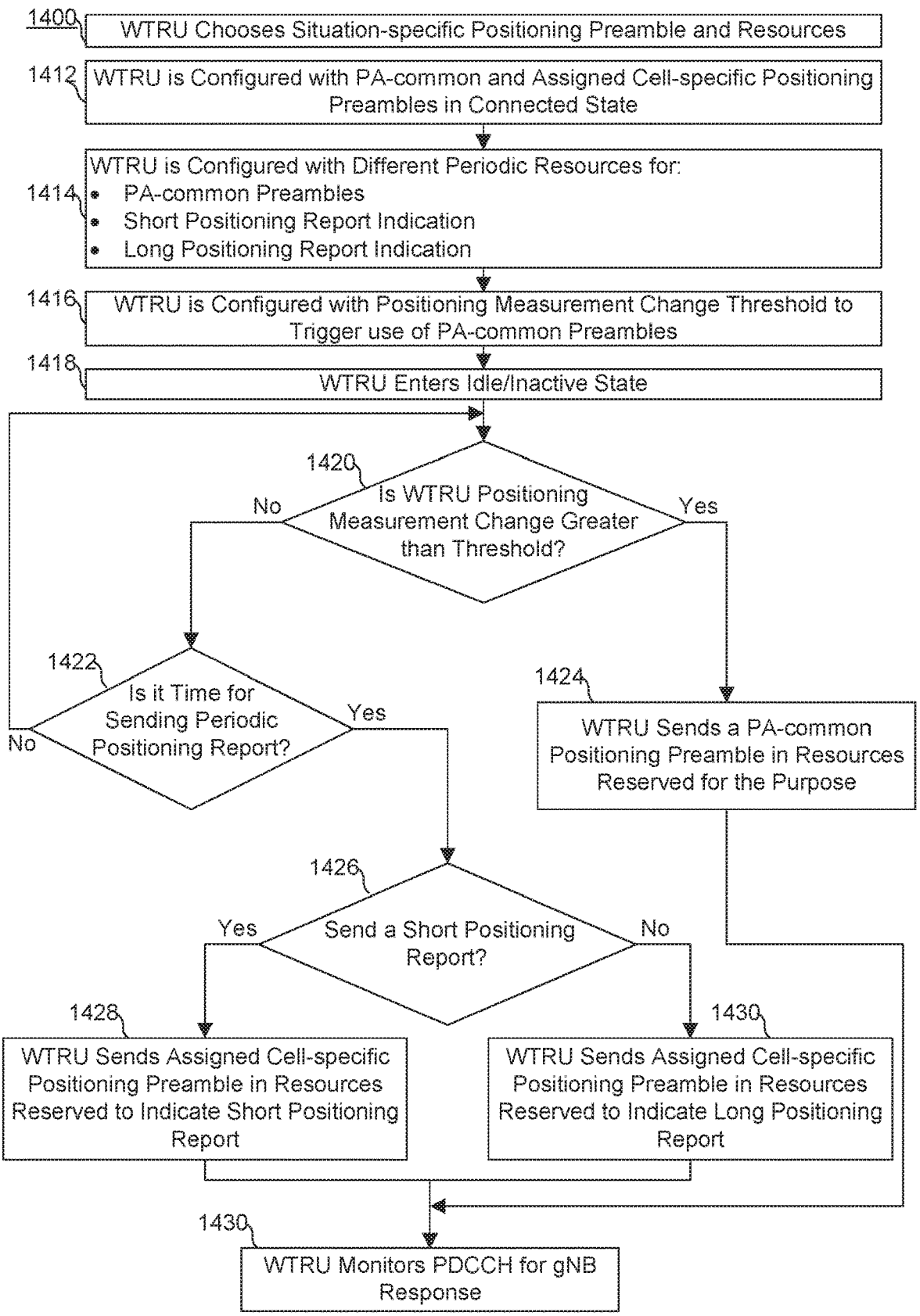
FIG. 14 is a diagram illustrating an example of positioning preamble choices by a WTRU.

FIG. 14 illustrates an example of a procedure 1400 of positioning preamble choice by a WTRU to indicate specific condition to the BS. With reference to FIG. 14, the WTRU may choose the positioning preamble, (e.g., any of cell-specific and PA-common positioning preamble), based on its estimation of change in positioning measurements. According to embodiments, different pools of preambles may be associated with different sizes of positioning reports. For example, a mapping may be created between a pool of (e.g., available) preambles, and the size of the positioning report (e.g., that is going to be requested/transmitted), e.g. preamble from pool A for short length positioning reports, preamble from pool B for moderate length positioning reports, preamble from pool C for long length positioning reports, etc. The WTRU may indicate an amount of requested resources for positioning reporting by selecting (e.g., transmitting) a positioning preamble from the appropriate pool.

In a step 1412, a WTRU, in a connected state, may be configured with any of PA-common and assigned cell-specific positioning preambles. In a step 1414, the WTRU may be configured with (e.g., different periodic) resources for any of PA-common preambles, short positioning report indications, long positioning report indications. In a step 1416, the WTRU may be configured with a positioning measurement change threshold to trigger use of PA-common preambles. In a step 1418, the WTRU may enter in idle/inactive state. In a step 1420 it may be determined whether a WTRU positioning measurement change is greater than the (e.g., configured) threshold. If the WTRU positioning measurement change is greater than the (e.g., configured) threshold, the WTRU may send a PA-common positioning preamble in resources reserved for that purpose in a step 1424. Otherwise (e.g., if the WTRU positioning measurement change is less than the (e.g., configured) threshold), it may be determined in a step 1422 whether it is time for sending a periodic positioning report. If it is time to send the periodic positioning report, it may be determined in a step 1426 whether the WTRU may send a short positioning report. If the WTRU wants to send a short positioning report, in a step 1428, the WTRU may send an assigned cell-specific positioning preamble in resources reserved to indicate short positioning report. If the WTRU does not want to send a short positioning report, in a step 1430, the WTRU may send an assigned cell-specific positioning preamble in resources reserved to indicate long positioning report. After sending an assigned cell-specific positioning preamble, in a step 1430, the WTRU may monitor the PDCCH for a response of the BS.

Figure 15:
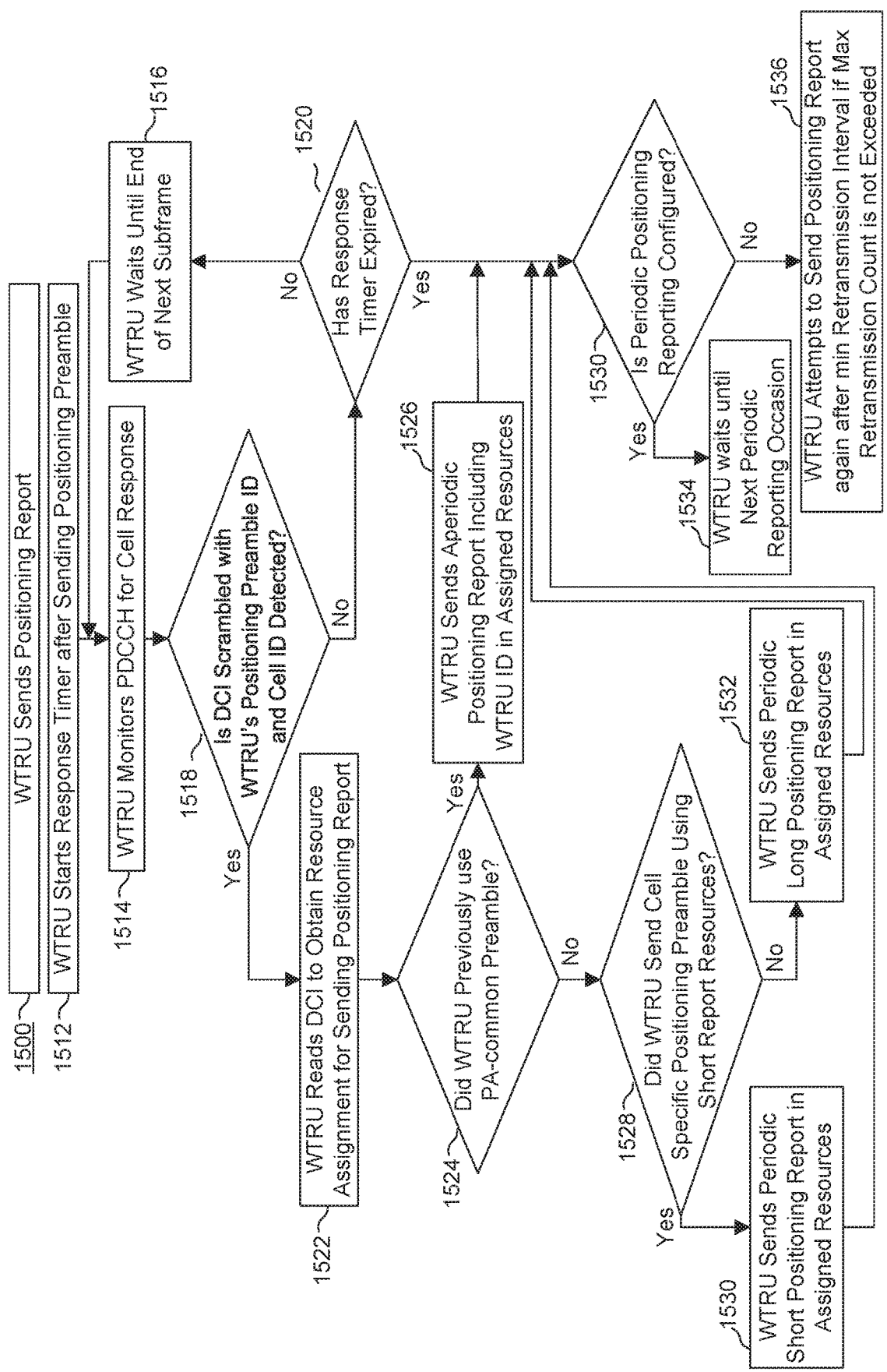
FIG. 15 is a diagram illustrating an example a positioning report transmission.

FIG. 15 shows an example of a procedure 1500 of WTRU operation for idle/inactive mode positioning report transmission in idle/inactive mode using a new physical channel. With reference to FIG. 15, a WTRU may send an unscheduled report when it senses that the positioning measurements relative to the previous measurements have changed by a value larger than a (e.g., pre-configured threshold) value. According to the illustrated example, the WTRU may be configured for periodic positioning reporting.

In a step 1512, a WTRU may start a response timer after sending a positioning preamble. In a step 1514, the WTRU may monitor the PDCCH for a (e.g., cell) response. In a step 1518 it may be determined whether the DCI is scrambled with a WTRU's positioning preamble ID, and whether a cell ID is detected. If the DCI is scrambled with a WTRU's positioning preamble ID and the cell ID is detected, in a step 1522, the WTRU may read the DCI to obtain a resource assignment for sending a positioning report. In a step 1524, it may be determined whether the WTRU previously used a PA-common preamble. If the WTRU did not previously use a PA-common preamble, in a step 1528, it may be determined whether the WTRU sent cell specific positioning preambles using short report resources. If the WTRU sent cell specific positioning preambles using short report resources, in a step 1530, the WTRU may send a periodic short positioning report in the assigned resources. Otherwise, in a step 1532, the WTRU may send a periodic long positioning report in the assigned resources. If it is determined in the step 1524 that the WTRU previously used a PA-common preamble, in a step 1526, the WTRU may send aperiodic positioning reports including a WTRU ID in the assigned resources. In a step 1530, it may be determined whether a periodic positioning reporting is configured. If a periodic positioning reporting is configured, in a step 1534, the WTRU may wait until the next periodic reporting occasion. Otherwise, in a step 1536, the WTRU may (e.g., attempt to) send a positioning report (e.g., again) after a (e.g., minimum) retransmission interval if a (e.g., maximum) number of retransmissions is not exceeded. If it is determined, in the step 1518, that the DCI is not scrambled with a WTRU's positioning preamble ID and/or the cell ID is not detected, it may be determined, in a step 1520, whether the response timer has expired. If the response timer has not expired the WTRU may wait until the end of the next sub frame in a step 1516. Otherwise, the procedure may transition to the step 1530.

Figure 16:
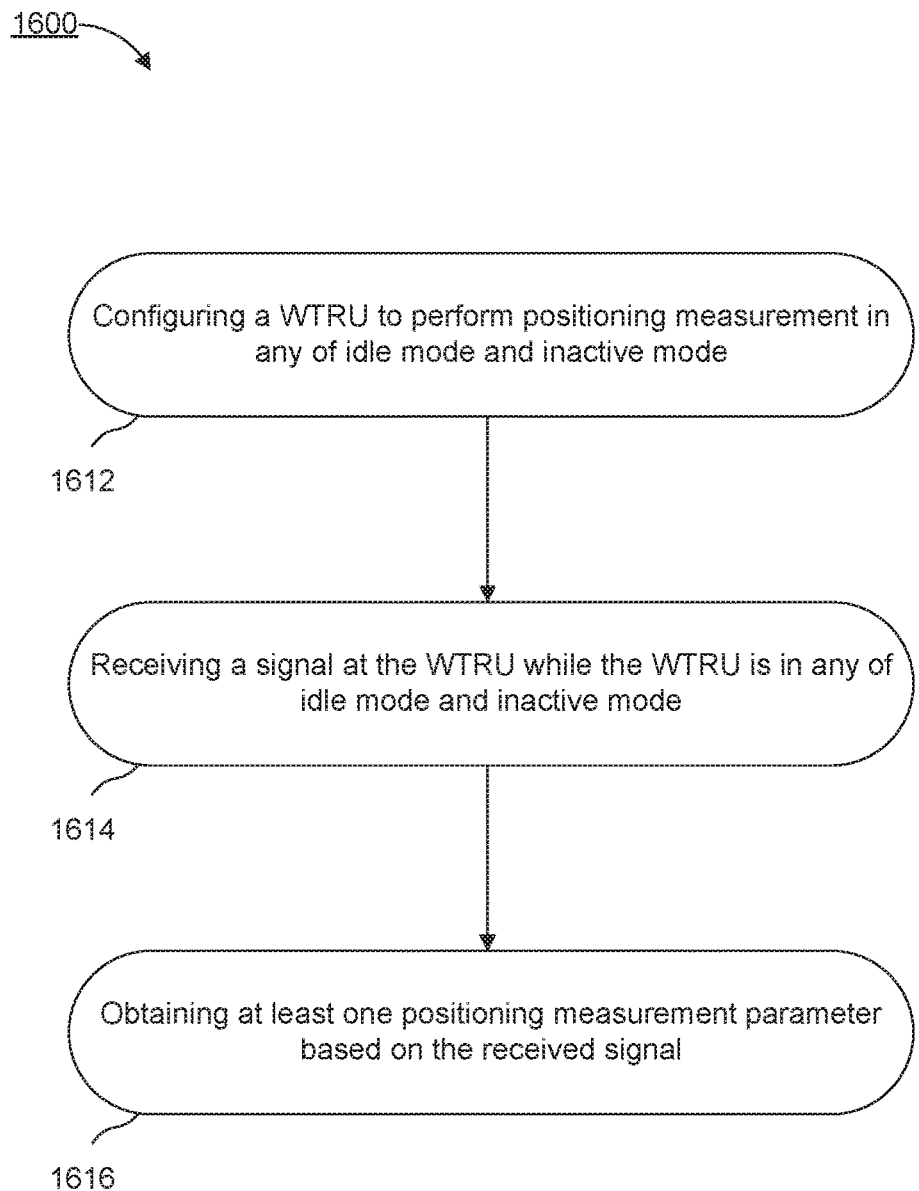
FIG. 16 is a diagram illustrating an example of idle/inactive mode positioning measurement.

FIG. 16 is a diagram illustrating an example of a procedure 1600 for idle/inactive mode positioning measurement. In a step 1612, a WTRU may be configured to perform positioning measurement in any of idle mode and inactive mode. In a step 1614, the WTRU may receive a signal while the WTRU is in any of idle mode and inactive mode. In an embodiment, the received signal may be any of a PSS, a SSS, a DMRS, a CRS, and a PRS. In a step 1616, at least one positioning measurement parameter may be obtained based on the received signal. In an embodiment, the at least one positioning measurement parameter may be any of an RTT, an AOA, and an RSTD.

Figure 17:
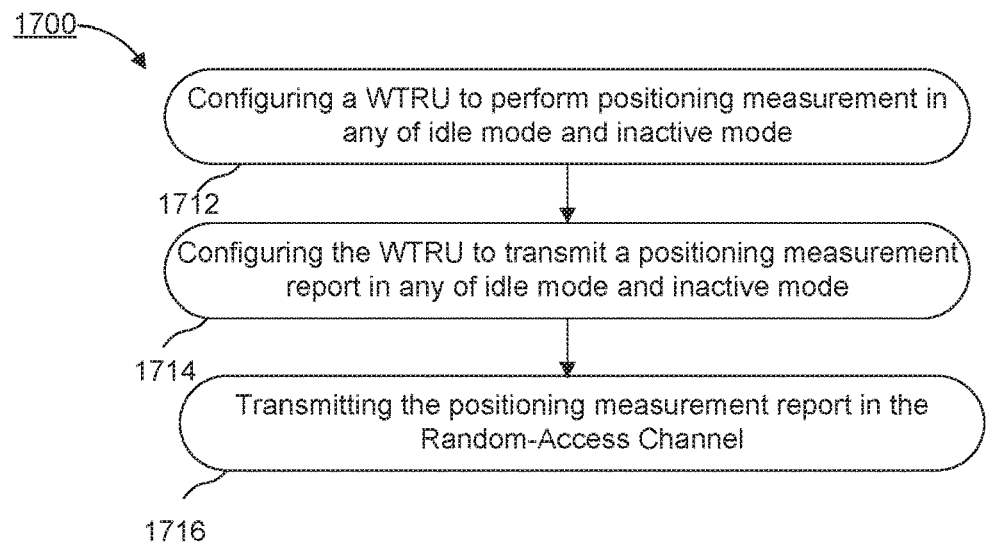
FIG. 17 and FIG. 18 are two diagrams illustrating two examples of idle/inactive mode positioning measurement reporting.

FIG. 17 is a diagram illustrating an example of a procedure 1700 for idle/inactive mode positioning measurement reporting. In a step 1712, a WTRU may be configured to perform positioning measurement in any of idle mode and inactive mode. In a step 1714, the WTRU may be configured to transmit a positioning measurement report in any of idle mode and inactive mode. In an embodiment, the positioning measurement report may comprise the at least one positioning measurement parameter. In a step 1716, the WTRU may transmit the positioning measurement report in the RACH. In an embodiment, the positioning measurement report may be transmitted in a RACH preamble. In an embodiment, the positioning measurement report may be transmitted appended to a RACH preamble.

Figure 18:
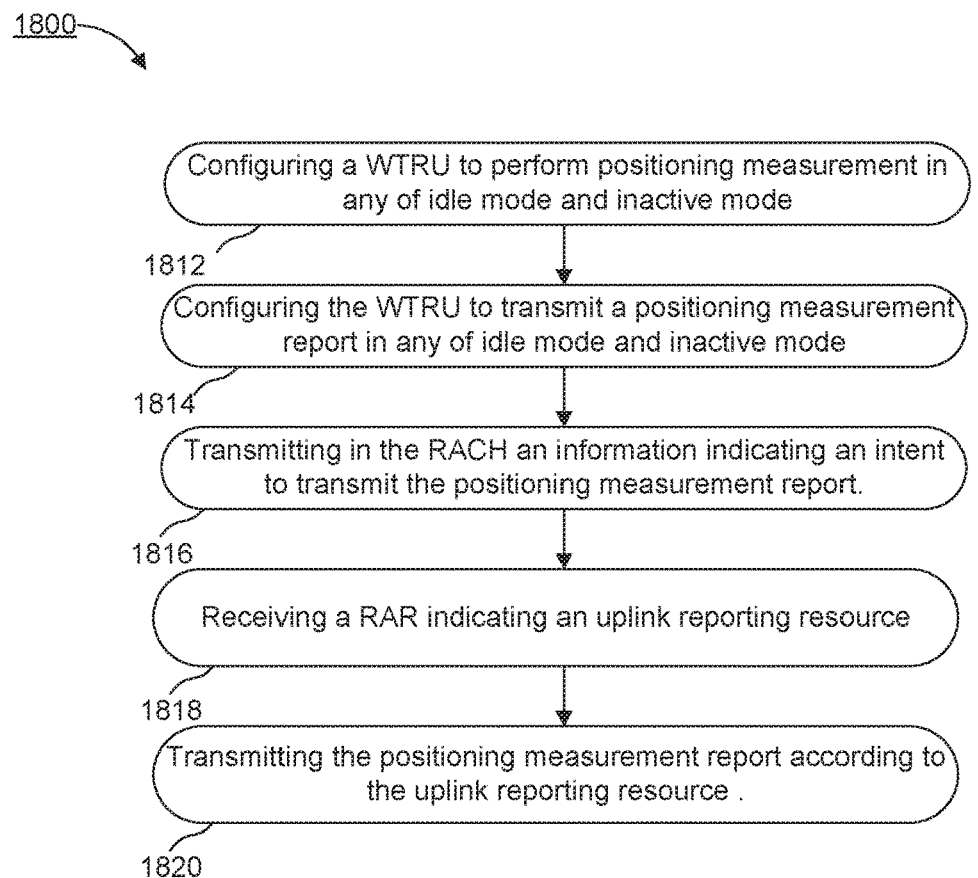

FIG. 18 is a diagram illustrating an example of a procedure 1800 for idle/inactive mode positioning measurement reporting. In a step 1812, a WTRU may be configured to perform positioning measurement in any of idle mode and inactive mode. In a step 1814, the WTRU may be configured to transmit a positioning measurement report in any of idle mode and inactive mode. In a step 1816, the WTRU may transmit in the RACH an information indicating an intent to transmit the positioning measurement report. In a step 1818, the WTRU may receive a RAR indicating an uplink reporting resource. In a step 1820, the WTRU may transmit the positioning measurement report according to the uplink reporting resource. According to embodiments, an apparatus comprising circuitry, including any of a transmitter, receiver, processor and memory, may be configured to carry out a method according to any of FIG. 16, FIG. 17 and FIG. 18. In an embodiment, the apparatus may be any of a WTRU and a base station. According to embodiments, an apparatus comprising circuitry, including any of a transmitter, receiver, processor and memory, may be configured to carry out a method comprising complementary functions forth described in any of FIG. 16, FIG. 17 and FIG. 18. According to embodiments, any of a non-transitory computer readable storage medium and a computer program may comprise instructions which when executed by a computer may cause the computer to carry out a method according to any of FIG. 16, FIG. 17 and FIG. 18. According to embodiments, any of a non-transitory computer readable storage medium and a computer program may comprise instructions which when executed by a computer may cause the computer to carry out a method comprising complementary functions to the functions forth described in any of FIG. 16, FIG. 17 and FIG. 18.

Figure 19:
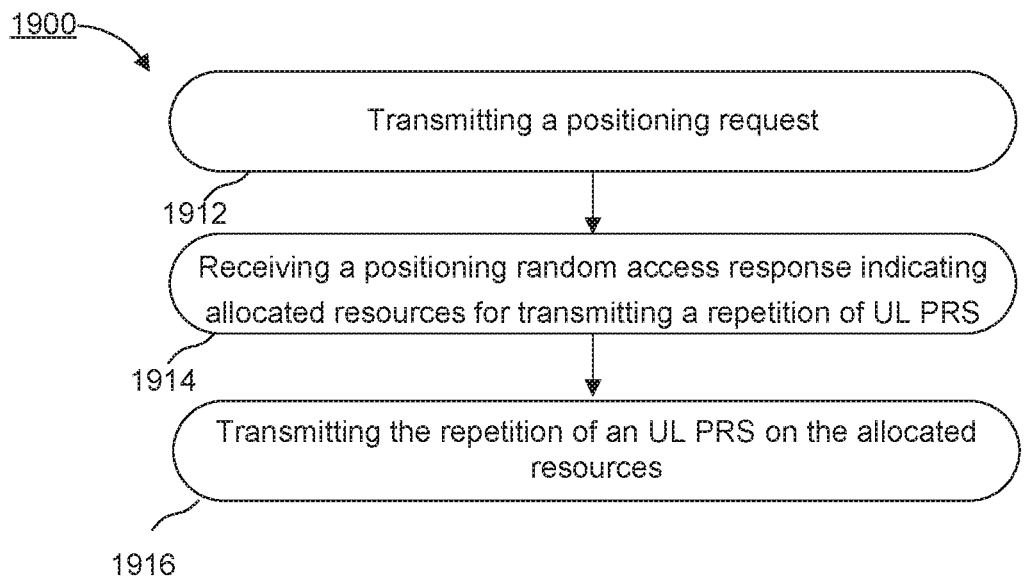
FIG. 19 and FIG. 20 are two diagrams illustrating two examples of uplink-based positioning.

FIG. 19 is a diagram illustrating an example of a procedure 1900 for uplink-based positioning in a WTRU. In a step 1912, a WTRU may transmit a positioning request. In a step 1914, the WTRU may receive a PRAR indicating allocated resources for transmitting a repetition of an uplink positioning reference signal. In a step 1916, the WTRU may transmit the repetition of UL PRS on the allocated resources. In an embodiment, the WTRU may be in any of idle mode and inactive mode. In an embodiment, a positioning request transmission may be any of a transmission of a positioning specific preamble (e.g., in any resource) and (e.g., any) transmission in a positioning specific resource. In an embodiment the WTRU may be configured with (e.g., receive a configuration information indicating) any of a set of positioning specific preambles, a set of positioning specific resources, a periodicity for transmitting positioning requests and any of start and stop times for transmitting positioning requests. In an embodiment, the positioning request may be transmitted after any of a timer expiry and a reception of downlink reference signals indicating a positioning change of the WTRU. In an embodiment, the positioning RAR may further include information indicating any of a timing advance, a temporary WTRU ID, a bandwidth part, a set of resources to transmit a WTRU ID, and an uplink configuration to transmit the repetition of UL PRS. In an embodiment, the positioning RAR may further include a number of repeated transmissions of UL PRS. In an embodiment, the temporary WTRU identifier may be any of a T-CRNTI and a TP-RNTI. In an embodiment, the WTRU ID may be any of a S-TMSI, a 5G-S-TMSI, and a Positioning-TMSI. In an embodiment, the UL PRS may be based on the WTRU ID. In an embodiment, the temporary WTRU identifier may be used to scramble the WTRU ID.

Figure 20:
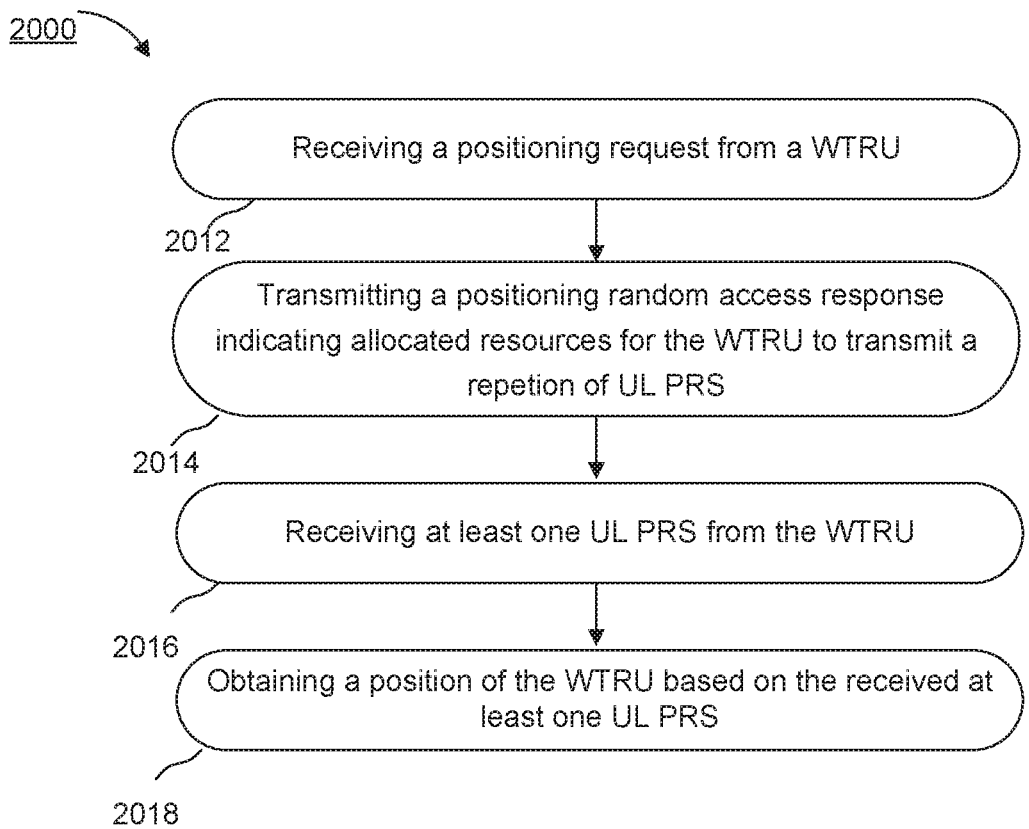

FIG. 20 is a diagram illustrating an example of a procedure 2000 for uplink-based positioning in a base station. In a step 2012, a BS may receive a positioning request from a WTRU. In a step 2014, the BS may transmit a positioning RAR indicating allocated resources for the WTRU to transmit a repetition of UL PRS. In a step 2016, the BS may receive at least one UL PRS from the WTRU. In a step 2018, the BS may obtain a position of the WTRU based on received at least one UL PRS.

According to embodiments, an apparatus comprising circuitry, including any of a transmitter, receiver, processor and memory, may be configured to carry out a method according to any of FIG. 19 and FIG. 20. In an embodiment, the apparatus may be any of a WTRU and a base station. According to embodiments, any of a non-transitory computer readable storage medium and a computer program may comprise instructions which when executed by a computer may cause the computer to carry out a method according to any of FIG. 19 and FIG. 20.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit/receive unit (WTRU), the method comprising:
   transmitting a positioning request by any of transmitting a positioning specific preamble and transmitting a preamble in a positioning specific resource, wherein the WTRU is in any of idle mode and inactive mode;
   receiving a positioning random access response (positioning RAR) indicating allocated resources for transmitting a repetition of an uplink positioning reference signal (UL PRS); and
   transmitting the UL PRS at least two times in the allocated resources.

2. The method according to claim 1, further comprising receiving configuration information indicating any of a set of positioning specific preambles and a set of positioning specific resources.

3. The method according to claim 1, further comprising receiving configuration information indicating any of a periodicity for transmitting positioning requests and periodic start and stop times for transmitting the positioning requests.

4. The method according to claim 1, wherein the positioning request is transmitted upon a determination that an amount of time has elapsed.

5. The method according to claim 1, wherein the positioning request is transmitted after determining a positioning change of the WTRU by detecting a change in received downlink reference signals.

6. The method according to claim 1, wherein the positioning RAR includes information indicating any of a timing advance, a temporary WTRU identifier, a bandwidth part, a set of resources to transmit a WTRU identifier, uplink configuration information to be used when retransmitting the UL PRS, and a number of repeated transmissions of UL PRS.

7. The method according to claim 6, wherein the UL PRS is based on the WTRU identifier.

8. The method according to claim 6, wherein the temporary WTRU identifier is used to scramble the WTRU identifier.

9. The method according to claim 1, wherein the positioning request is transmitted by transmitting the positioning specific preamble.

10. The method according to claim 1, wherein the positioning request is transmitted by transmitting the preamble in the positioning specific resource.

11. An apparatus comprising circuitry, including any of a transmitter, receiver, processor and memory, configured to:
   transmit a positioning request by any of transmitting a positioning specific preamble and transmitting a preamble in a positioning specific resource, wherein the apparatus is in any of idle mode and inactive mode;
   receive a positioning random access response (positioning RAR) indicating allocated resources for transmitting a repetition of an uplink positioning reference signal (UL PRS); and
   transmit the UL PRS at least two times in the allocated resources.

12. The apparatus according to claim 11, further configured to receive configuration information indicating any of a set of positioning specific preambles and a set of positioning specific resources.

13. The apparatus according to claim 11, further configured to receive configuration information indicating any of a periodicity for transmitting positioning requests and periodic start and stop times for transmitting the positioning requests.

14. The apparatus according to claim 11, further configured to transmit the positioning request upon a determination that an amount of time has elapsed.

15. The apparatus according to claim 11, further configured to transmit the positioning request after determining a positioning change of the apparatus by detecting a change in received downlink reference signals.

16. The apparatus according to claim 11, wherein the positioning RAR includes information indicating any of a timing advance, a temporary WTRU identifier, a bandwidth part, a set of resources to transmit a WTRU identifier, uplink configuration information to be used when retransmitting the UL PRS, and a number of repeated transmissions of UL PRS.

17. The apparatus according to claim 16, wherein the UL PRS is based on the WTRU identifier.

18. The apparatus according to claim 16, wherein the temporary WTRU identifier is used to scramble the WTRU identifier.

19. The apparatus according to claim 11, wherein the positioning request is transmitted by transmitting the positioning specific preamble.

20. The apparatus according to claim 11, wherein the positioning request is transmitted by transmitting the preamble in the positioning specific resource.

* * * * *